United States Patent
Shimizu et al.

(10) Patent No.: US 9,874,330 B2
(45) Date of Patent: Jan. 23, 2018

(54) LIGHT PROJECTION DEVICE AND HEAD LAMP FOR VEHICLE

(71) Applicant: USHIO DENKI KABUSHIKI KAISHA, Tokyo (JP)

(72) Inventors: Mikio Shimizu, Tokyo (JP); Masashi Okamoto, Tokyo (JP); Akihiko Sugitani, Tokyo (JP)

(73) Assignee: USHIO DENKI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/317,765

(22) PCT Filed: Jun. 8, 2015

(86) PCT No.: PCT/JP2015/066486
§ 371 (c)(1),
(2) Date: Dec. 9, 2016

(87) PCT Pub. No.: WO2015/190437
PCT Pub. Date: Dec. 17, 2015

(65) Prior Publication Data
US 2017/0175968 A1 Jun. 22, 2017

(30) Foreign Application Priority Data

Jun. 13, 2014 (JP) .................................. 2014-122565
Mar. 5, 2015 (JP) .................................. 2015-043116

(51) Int. Cl.
*F21S 8/10* (2006.01)
*G02B 26/10* (2006.01)
(Continued)

(52) U.S. Cl.
CPC ....... *F21S 48/1757* (2013.01); *F21S 48/1145* (2013.01); *F21S 48/1225* (2013.01);
(Continued)

(58) Field of Classification Search
CPC .. F21S 48/11; F21S 48/12; F21S 48/17; F21S 8/10; F21S 8/12; G02B 26/10;
(Continued)

(56) References Cited

U.S. PATENT DOCUMENTS 9,435,503 B2   9/2016  Masuda et al.
2011/0128602 A1*  6/2011  Hamano ............ G02B 13/0005
                                              359/205.1

FOREIGN PATENT DOCUMENTS

JP   2012-146621 A   8/2012
JP   2013-125693 A   6/2013
(Continued)

OTHER PUBLICATIONS

International Search Report issued in PCT/JP2015/066486; dated Sep. 1, 2015.

*Primary Examiner* — Sultan Chowdhury
*Assistant Examiner* — Danell L Owens
(74) *Attorney, Agent, or Firm* — Studebaker & Brackett PC

(57) ABSTRACT

Disclosed herein a light projection device and a head lamp for vehicle capable of highly increasing and decreasing the illuminance of a plurality of specific regions in a light distribution designed in advance with high degree of freedom. The light projection device includes: a first optical system that forms a second light radiation region; a dynamic light deflection unit configured to deflect a light beam involved in forming the second light radiation region; a second optical system configured to project the deflected light beam to form a third light radiation region; and a deflection pattern generation unit configured to deflect and output each ray of the light beam such that a direction of deflection to be imparted is dependent on a position at which each ray is incident on the light incident portion.

12 Claims, 10 Drawing Sheets

(51) Int. Cl.
  *G02B 26/12* (2006.01)
  *G03H 1/02* (2006.01)
  *G03H 1/24* (2006.01)
  *F21Y 115/30* (2016.01)
  *F21Y 113/13* (2016.01)
  *G02B 27/14* (2006.01)

(52) U.S. Cl.
  CPC ........ *F21S 48/1241* (2013.01); *G02B 26/105* (2013.01); *G02B 26/124* (2013.01); *G02B 26/125* (2013.01); *G03H 1/0248* (2013.01); *G03H 1/24* (2013.01); *F21Y 2113/13* (2016.08); *F21Y 2115/30* (2016.08); *G02B 27/141* (2013.01)

(58) Field of Classification Search
  CPC ........ G02B 26/12; G02B 27/10; G02B 27/14; G03H 1/02; G03H 1/24; F21Y 2115/30; B60Q 1/14; F21W 101/10
  USPC ..................... 359/196.1–226.2; 362/459–549
  See application file for complete search history.

(56) References Cited

FOREIGN PATENT DOCUMENTS

| | | |
|---|---|---|
| JP | 2013-232390 A | 11/2013 |
| JP | 2014-017094 A | 1/2014 |

\* cited by examiner

LIGHT PROJECTION DEVICE AND HEAD LAMP FOR VEHICLE

TECHNICAL FIELD

The present invention relates to a light projection device that has a light emitting element such as a semiconductor laser or the like. The light projection device can be used in, for example, an illumination apparatus, such as a head lamp for a vehicle.

BACKGROUND ART

Conventional filament lamps, such as a halogen lamp, have been used for a long time as light sources for head lamps for vehicles, but long-life HID lamps, such as a metal halide lamp or the like, or LEDs with longer life and higher efficiency are also used in recent years.

In this way, advances in light source elements themselves have been made in order to increase the lifetime and the efficiency thereof, but the control of head lamp light beams merely involves primarily switching between a so-called high beam and a low beam (i.e., passing head lamp).

These days, however, researches are being carried out that aim to more finely control the head lamp light beams with the use of a light emitting element of, in particular, a solid state light source, and some proposals have been made.

For example, Japanese Patent Application Laid-Open Publication (Kokai) No. 2012-146621 describes a technique in which a hologram is illuminated by a semiconductor laser and a head lamp light beam having a desired light distribution is generated with diffracted light from the hologram.

This technique includes a proposal of enabling a different hologram to be selected from a plurality of holograms in accordance with the position at which the rotation is stopped, and also a proposal of disposing a liquid crystal prism that changes the direction of illumination light in accordance with an applied voltage and switching between a high beam light distribution and a low beam light distribution in accordance with the voltage.

Such technique, however, suffers from shortcomings that the only operation with high responsiveness is the switching between the high beam and the low beam and the selectivity from the plurality of holograms is low with only a limited number of options.

Also, Japanese Patent Application Laid-Open Publication No. 2013-125693 describes a technique of generating a headlamp light beam having a desired light distribution by scanning a white laser light beam generated by mixing laser light beams of three primary colors R, G, and B with the use of a two-dimensional galvanometer (or alternatively a polygon mirror) in order to improve the visibility.

This technique includes a proposal of enhancing, for example, the blue (or bluish) color in the illumination light at the shoulder of a road, and also a proposal of lowering the color temperature or illuminating a pedestrian with a more noticeable color in the case of a long drive or an elderly driver.

Such technique provides a desired light distribution through the two-dimensional scanning and may thus offer high degree of freedom in dynamically changing the light distribution condition or the like. However, the illumination laser light beam emitted at each moment as a head lamp light beam has a thin beam shape, and thus special measures for ensuring the safety need to be taken, which still remains as an unsolved problem.

LISTING OF PRIOR ART REFERENCES

PATENT LITERATURE DOCUMENT 1: Japanese Patent Application Laid-Open Publication No. 2012-146621
PATENT LITERATURE DOCUMENT 2: Japanese Patent Application Laid-Open Publication No. 2013-125693

SUMMARY OF THE INVENTION

Problems to be Solved by the Invention

An object of the present invention is to provide a light projection device and a head lamp for a vehicle that is capable of ensuring the safety even in a case in which a semiconductor laser is used as a light emitting element and that is capable of highly increasing and decreasing the illuminance of a plurality of specific regions in a light distribution designed in advance with high degree of freedom.

Solution to Overcome the Problems

According to a first aspect of the present invention, there is provided a light projection device including: at least one light emitting element (Sc); a power feeding circuit (Ps) configured to drive the light emitting element (s) (Sc); a first optical system (Eu) that has a first light radiation region (Gs) formed by light from the light emitting element (s) (Sc) and that forms a second light radiation region (Gu) by projecting light from the first light radiation region (Gs); a dynamic light deflection unit (Md) that deflects a light beam (Bu) involved in forming the second light radiation region (Gu) in the vicinity of the second light radiation region (Gu); a second optical system (Ef) that is disposed downstream from the dynamic light deflection unit (Md) and that, upon receiving a deflected light beam (Bd) obtained by deflecting the light beam (Bu) by the dynamic light deflection unit (Md), projects the deflected light beam (Bd) to form a third light radiation region (Gf); and a deflection pattern generation unit (Fm) that is disposed downstream from the second optical system (Ef) and that deflects and outputs each ray of the light beam incident to the deflection pattern generation unit so as to convert the incident light beam to an exit light beam (Bmo).

The deflection pattern generation unit (Fm) is configured such that, when the deflection pattern generation unit (Fm) deflects and outputs each ray of the light beam incident to a light incident portion (Pmi) of the deflection pattern generation unit, a direction of deflection to be imparted to each ray is dependent on a position at which the ray concerned is incident on the light incident portion (Pmi).

The second optical system (Ef) forms, at a far side, an image conjugate to the first light radiation region (Gs) and forms the third light radiation region (Gf) within a partial region of the light incident portion (Pmi), and the dynamic light deflection unit (Md) continues with an operation of continuously changing the direction in which the light beam (Bu) is deflected, whereby the third light radiation region (Gf) is moved continuously on the light incident portion (Pmi).

In the light projection device according to a second aspect of the present invention, the second light radiation region (Gu) is conjugate to the first light radiation region (Gs).

In the light projection device according to a third aspect of the present invention, the third light radiation region (Gf) formed by the second optical system (Ef) is conjugate to an exit pupil (Quo) of the first optical system (Eu).

In the light projection device according to a fourth aspect of the present invention, the first light radiation region (Gs) is formed by a plurality of light emitting elements (Sc1, Sc2, . . . ), and the third light radiation region (Gf) is formed by light radiation sub regions (Gf1, Gf2, . . . ) divided so as to correspond to the respective light emitting elements (Sc1, Sc2, . . . ).

In the light projection device according to a fifth aspect of the present invention, the first optical system (Eu) forms the second light radiation region (Gu) having an elongated shape that is parallel to a deflection axis of the dynamic light deflection unit (Md).

In the light projection device according to a sixth aspect of the present invention, the deflection pattern generation unit (Fm) is divided into a plurality of segments (A1, A2, . . . , A9), and dependence of the direction of the deflection to be imparted on the position at which the ray is incident on the light incident portion (Pmi) is defined for each of the segments (A1, A2, . . . , A9) such that the exit light beam (Bmo) formed when the third light radiation region (Gf) is located thereon has a specific exit direction distribution.

The light projection device according to a seventh aspect of the present invention further includes a modulation control circuit (Ux) that modulates an input power to the light emitting element (Sc), and a scanning position detection unit that detects a position of the third light radiation region (Gf) on the deflection pattern generation unit (Fm). The modulation control circuit (Ux) modulates the input power to the light emitting element (Sc) depending on the position of the third light radiation region (Gf) on the deflection pattern generation unit (Fm) on the basis of information from the scanning position detection unit and thus raises or lowers luminous intensity of a light beam having a specific exit direction distribution among the exit light beam (Bmo) such that the luminous intensity of the light beam becomes greater or smaller than defined standard luminous intensity.

In the light projection device according to an eighth aspect of the present invention, the modulation control circuit (Ux) has a lookup table that stores data, which is used when modulating the input power to the light emitting element (Sc) depending on the position (x) of the third light radiation region (Gf) on the deflection pattern generation unit (Fm), for each address corresponding to the position (x). When the lookup table is read, the data for modulation is read on the basis of an address value generated from a digital numerical value of the position (x) generated by the scanning position detection unit.

In order to achieve that the direction of the deflection to be imparted is dependent on the position at which the ray is incident on the light incident portion (Pmi), the light projection device according to a ninth aspect of the present invention is configured such that the deflection pattern generation unit (Fm) has a light reflective surface of which normal direction varies with a position thereof.

In order to achieve that the direction of the deflection to be imparted is dependent on the position at which the ray is incident on the light incident portion (Pmi), the light projection device according to a tenth aspect of the present invention is configured such that the deflection pattern generation unit (Fm) has a light refractive medium of which thickness or refractive index varies with a position thereof.

In order to achieve that the direction of the deflection to be imparted is dependent on the position at which the ray is incident on the light incident portion (Pmi), the light projection device according to an eleventh aspect of the present invention is configured such that the deflection pattern generation unit (Fm) has a diffraction grating having an interference fringe of which phase varies with a position thereof.

An on-vehicle headlamp according to a twelfth aspect of the present invention projects light by using the light projection device according to one of the first through eleventh aspects of the present invention.

Advantageous Effects of the Invention

According to embodiments of the present invention, it is possible to provide a light projection device and a head lamp for a vehicle that is capable of ensuring the safety even in a case in which a semiconductor laser is used as a light emitting element and that is capable of highly increasing and decreasing the illuminance of a plurality of specific regions in a light distribution designed in advance with high degree of freedom.

DETAILED DESCRIPTION OF THE EMBODIMENTS

Figure 1:
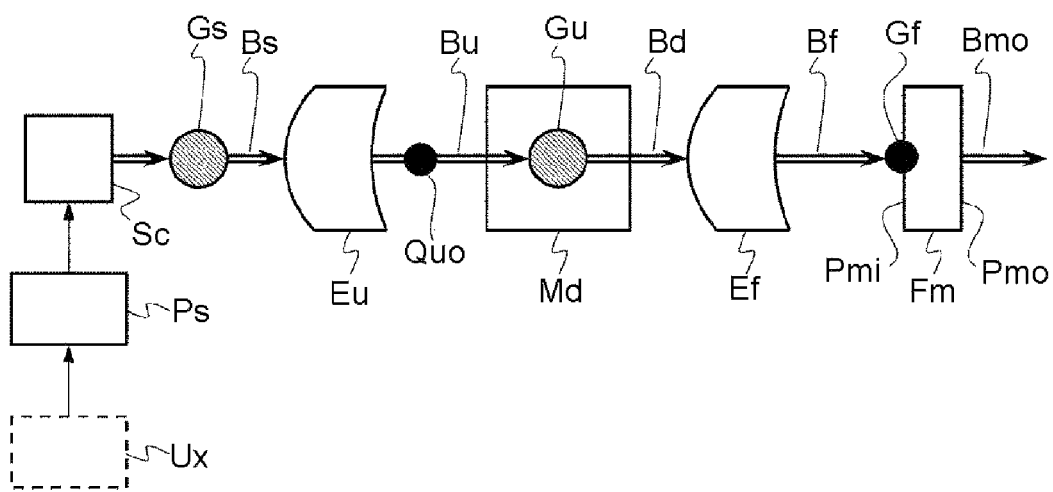
FIG. 1 is a block diagram illustrating a light projection device according to an embodiment of the present invention in a simplified manner.

The term "conjugate" as used in the description of the present invention is a general term in the field of geometrical optics. For example, when A and B are said to be conjugate to each other, this means that A is imaged at B or B is imaged at A through the action of an optical element, such as a lens, having an imaging function on the basis of at least the paraxial theory.

In this case, A and B are images and include, as objects, not only an isolated point image but also a set composed of a plurality of point images or an image with a spread in which point images are distributed contiguously.

The term "point image" or "image point" (i.e., "image") used herein is a general term in the field of geometrical optics and includes any of the following cases: a case in which light is actually emitted from the point; a case in which light converges toward the point and, if a screen is placed, illuminates a bright point on the screen; a case in which light seems to converge toward the point (but the point is inside an optical system, and a screen cannot be placed therein); and a case in which light seems to be emitted from the point (but the point is inside an optical system, and a screen cannot be placed therein). These cases are not differentiated from one another. In this case, a phenomenon in which the point ceases to be an ideal point or a diffraction limit image due to blurring arising because of aberration associated with imaging and the point being out of focus or the like is ignored.

The term "light radiation region" refers to a space or a plane that emits light or that is irradiated with light and may include the above-mentioned image. In a similar manner, the term includes any of the following cases: a case in which light is actually emitted from the region; a case in which light converges toward the region and, if a screen is placed, illuminates a bright region on the screen; a case in which light seems to converge toward the region (but the region is inside an optical system, and a screen cannot be placed therein); and a case in which light seems to be emitted from the region (but the region is inside an optical system, and a screen cannot be placed therein). These cases are not differentiated from one another.

The term "radiation plane element" refers to an image point that constitutes a light radiation region or a small (er) light radiation region.

In a case in which a light emitting element (Sc) is a semiconductor laser, if there is a single semiconductor laser, a first light radiation region (Gs) may be regarded simply as a single point light source. Then, typically, the semiconductor laser may be disposed on an optical axis of an optical system and may be oriented such that a center ray in the divergence direction distribution of divergent light from the semiconductor laser coincides with the optical axis.

However, a case in which a light source includes a plurality semiconductor lasers or in which radiation plane elements are distributed contiguously within a finite area in a light source requires a design that takes the entrance pupil, the exit pupil, and the principle ray of the optical system into consideration, and such a situation will be described hereinafter.

With a typical camera lens taken as an example, an aperture stop is typically present within a lens. The image of the aperture stop that can be seen through the lens when the lens is viewed from the side on which light is incident is referred to as an entrance pupil, the image of the aperture stop that can be seen through the lens when the lens is viewed from the side from which the light exits is referred to as an exit pupil, and the ray (typically, meridional ray) that travels toward the center of the entrance pupil or that travels from the center of the exit pupil is referred to as a principal ray.

In a broad sense, rays other than the principal ray are referred to as marginal rays.

It should be noted that, in an optical system that deals with light having directivity or directionality, such as laser, a light beam does not need to be cut out by an aperture stop, and thus an aperture stop is often not provided. In that case, the entrance pupil, the exit pupil, and the principle ray are defined by the mode in which light is present in the optical system.

Typical premises are that the center ray in a directional distribution of light of an emitted light beam from a radiation plane element is assumed to be the principal ray, the entrance pupil is assumed to be present at a position at which the principal ray incident to the optical system or the extended line thereof intersects with the optical axis, and the exit pupil is assumed to be present at a position at which the principal ray that exits from the optical system or the extended line thereof intersects with the optical axis.

Strictly speaking, however, there may be a case in which the principal ray and the optical axis defined as above do not intersect with each other and are merely at twisted positions, for example, due to an adjustment error.

Such a phenomenon, however, is not relevant to the essence of the present embodiment, and such a discussion is unfruitful. In the following description, therefore, it is considered that such a phenomenon does not occur or that the principal ray and the optical axis intersect with each other at positions where the principal ray and the optical axis are most proximal to each other.

With attention paid to two partial optical systems A and B that are adjacent to each other in an optical system, when A is adjacent to and immediately downstream from B, the exit pupil of A serves as the entrance pupil of B (in a similar manner to that the output image of A serves as the input image of B). In any case, the entrance pupil and the exit pupil of a partial optical system defined as desired within an optical system (all images of an aperture stop, if present, and even if no aperture stop is present,) should all be conjugate to each other. Thus, the entrance pupil and the exit pupil are simply referred to as a pupil, unless they need to be differentiated from each other.

In the description of the present invention and the drawings, the optical axis of an optical system is referred to as a z-axis. In a case in which the optical system is bent by a reflective mirror, the direction in which the ray that has traveled along the original z-axis travels upon being reflected is also referred to as the z-axis, and no new coordinate axis is defined.

Figure 2:
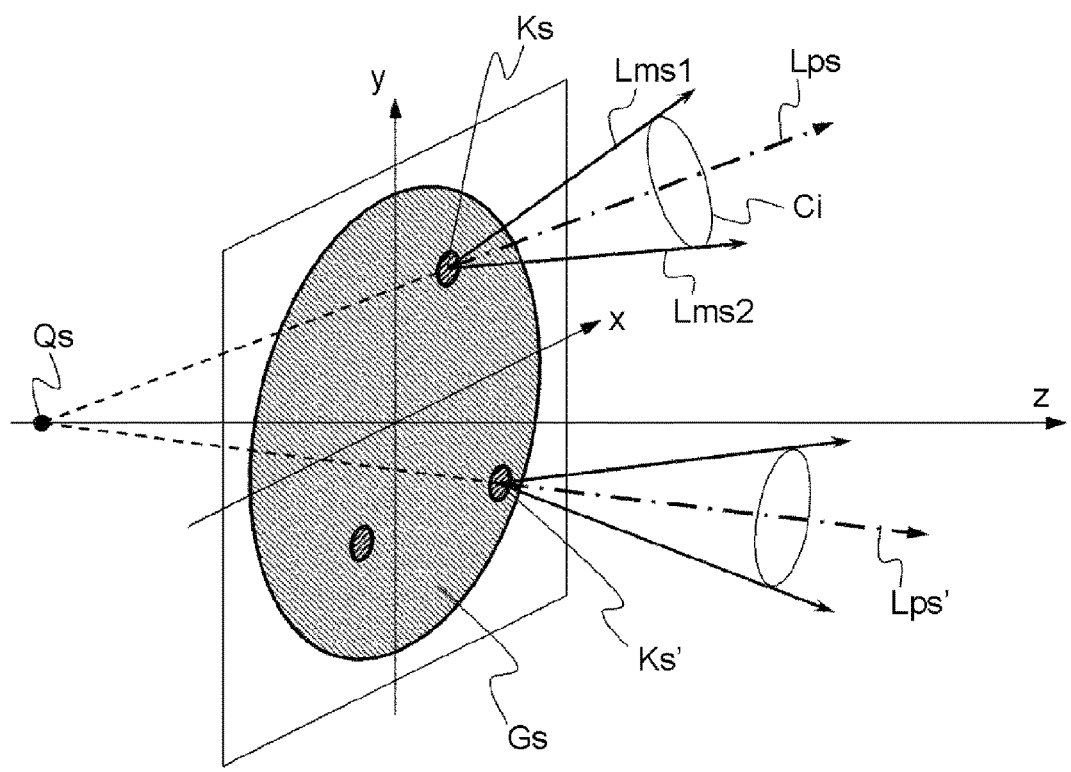
FIG. 2 is a conceptual diagram illustrating a portion of the light projection device according to the embodiment of the present invention in a simplified manner.

In the drawings such as FIG. 2, an x-axis and a y-axis are indicated for convenience as axes perpendicular to the z-axis.

Now, an embodiment for implementing the present invention will be described with reference to FIG. 1, which is a block diagram illustrating a light projection device according to the embodiment of the present invention in a simplified manner, and FIGS. 2 and 3, which are conceptual diagrams illustrating portions of the light projection device according to the embodiment of the present invention in a simplified manner.

In FIG. 1, when a light emitting element (Sc) is, for example, an edge-emitting semiconductor laser, a divergent light radiation portion that is housed in the semiconductor laser package and that is present on the surface of a semiconductor chip can be regarded substantially as a point light source, and this can serve as a first light radiation region (Gs).

Also, when the light emitting element (Sc) is a surface-emitting semiconductor laser or an LED, the emission surface thereof can serve as the first light radiation region (Gs).

FIG. 2 illustrates a state in which the first light radiation region (Gs) is constituted by a plurality of or distributed radiation plane elements (Ks, Ks', . . . ).

With attention paid to the radiation plane element (Ks), as indicated by outermost marginal rays (Lms1, Lms2), a light beam (or light flux) that forms the radiation plane element (Ks) is distributed within a conical angular range defined by a base (Ci), and a principal ray (Lps) of the light beam from this radiation plane element is defined as a center ray of this light beam distribution.

In general, the principal rays (Lps, Lps', . . . ) are each at an angle to the z-axis, which is the optical axis of the optical system, and thus it is considered that the pupil is present at a point (Qs) at which the principal rays (Lps, Lps', . . . ) intersect with the optical axis.

Figure 3:
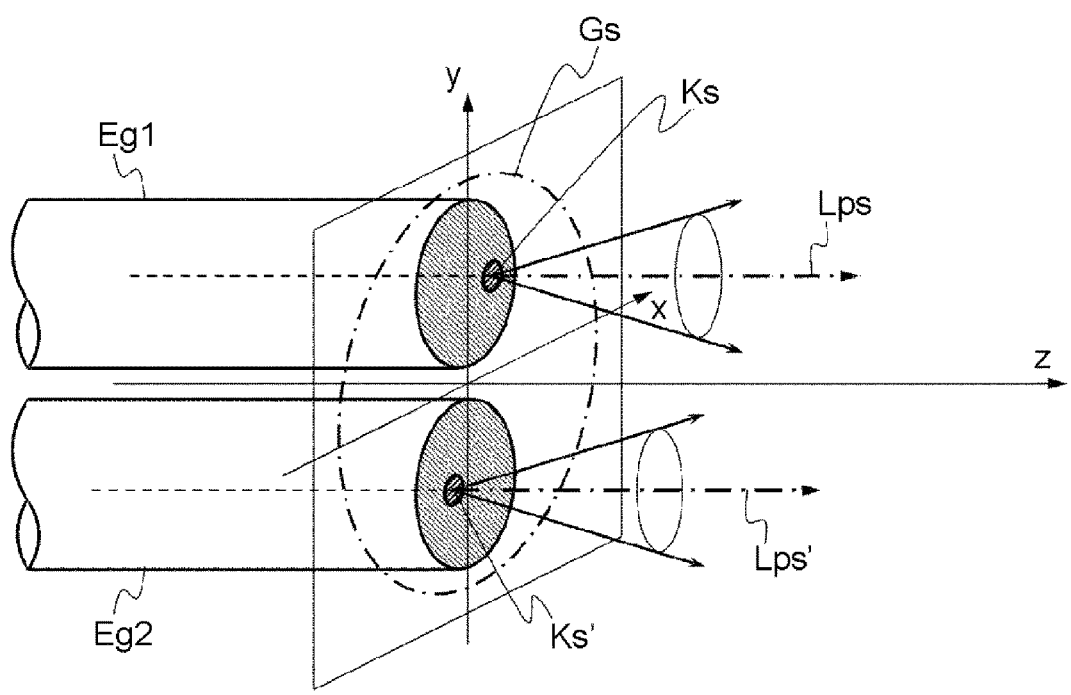
FIG. 3 is a conceptual diagram illustrating another portion of the light projection device according to the embodiment of the present invention in a simplified manner.

FIG. 3 illustrates a state in which the first light radiation region (Gs) is constituted by light emission ends of two optical fibers (Eg1, Eg2), or in other words, by the cores at the light emission end side.

Needless to say, the light emitting element is present at a light incident end that is opposite to the light emission end of each of the optical fibers (Eg1, Eg2), and light from the light emitting element is introduced to each light incident end with the use of a lens or the like.

In this case, the radiation plane elements (Ks, Ks', . . . ) may be considered to be distributed contiguously and substantially uniformly at the light emission ends of the optical fibers (Eg1, Eg2), and light is radiated from each of the radiation plane elements (Ks, Ks', . . . ) with a vertical angle of a conical angular range in which marginal rays are present in a distributed manner as defined by the structure of the optical fiber.

The principal rays (Lps, Lps', . . . ) of the light beams emitted from the respective radiation plane elements (Ks, Ks', . . . ) are parallel to the fiber axis, and the optical fibers (Eg1, Eg2) are disposed in bundle so as to be parallel to the z-axis, which is the optical axis of the optical system.

In this manner, when the principal rays (Lps, Lps', . . . ) are parallel to the optical axis of the optical system in this manner, it is considered that the pupil is present at infinity.

It should be noted that, in this case, the light emission ends of the optical fibers (Eg1, Eg2) themselves may be regarded as the radiation plane elements (Ks, Ks', . . . ).

In this manner, in the present embodiment, the first light radiation region (Gs) may be a light emitting element constituted by a point light source or distributed light sources. Alternatively, the first light radiation region may be a region that radiates light as light from a light emitting element is wave-guided thereto, or as the region is illuminated with light from the light emitting element.

Moreover, needless to say, these light radiation regions (including a case in which a light radiation region is constituted by a light emitting element) may be present in any number in the first light radiation region (Gs). The wavelength band of light radiated from the light radiation region may differ or may be the same in different light radiation regions, or a plurality of wavelength bands may be mixed.

A first optical system (Eu) constituted by a lens and other elements is disposed such that, upon receiving an input of a light beam (light flux) (Bs) from the first light radiation region (Gs), the first optical system (Eu) forms a second light radiation region (Gu) in the vicinity of a deflection point of a dynamic light deflection unit (Md) on the downstream side therefrom as a projection region of the first light radiation region (Gs).

More specifically, the dynamic light deflection unit (Md) deflects a light beam (Bu) involved in forming the second light radiation region (Gu) at the deflection point located in the vicinity of the second light radiation region (Gu).

A second optical system (Ef) constituted by a lens and other elements is disposed such that the second optical system (Ef) converts a deflected light beam (Bd), which is deflected by the dynamic light deflection unit (Md), to a light beam (Bf) that forms an image conjugate to the first light radiation region (Gs) at a far side, and forms a third light radiation region (Gf) at a portion of a light incident portion (Pmi) of a deflection pattern generation unit (Fm) on the downstream side therefrom.

Then, the deflection pattern generation unit (Fm) deflects and outputs each of the incident rays of the light beam (Bf) introduced to the light incident portion (Pmi) from the second optical system (Ef), and an exit light beam (Bmo) is output from a light exit portion (Pmo) of the deflection pattern generation unit (Fm).

Here, the deflection pattern generation unit (Fm) is configured such that the direction of deflection to be imparted thereby is dependent on the position at which the ray is incident on the light incident portion (Pmi).

Also, the dynamic light deflection unit (Md) continuously changes the direction in which the light beam (Bu) is deflected, and thus the position of the third light radiation region (Gf) on the light incident portion (Pmi) continuously moves.

As a result, the exit direction of the exit light beam (Bmo) changes continuously along with the deflection operation of the dynamic light deflection unit (Md).

Therefore, by defining the dependence of the direction of deflection to be imparted (or provided) as described above on the position at which the ray is incident on the light incident portion (Pmi), it is possible that the state of a change in the exit direction of the exit light beam (Bmo), i.e., the light distribution at a far side is designed with higher degree of freedom.

It should be noted that the light exit portion (Pmo) does not necessarily have to be present separately from the light incident portion (Pmi), and there may be a case in which the light incident portion (Pmi) also serves as the light exit portion (Pmo), which will be described later.

The scanning of the third light radiation region (Gf) on the light incident portion (Pmi) is one dimensional, but on the other hand, the light distribution produced at a far side by the exit light beam (Bmo) is two dimensional.

For this reason, the exit light beam (Bmo) is inevitably a divergent light beam, rather than a beam with strong directionality or directivity. Thus, a certain level of safety is ensured even if a coherent light source, such as a semiconductor laser, is used as the light emitting element (Sc), and light from the light projection device directly hits a person in the eyes.

In this manner, the present embodiment allows use of a coherent light source as the light emitting element (Sc), and can send light with higher efficiency even when an optical fiber is used. Thus, the degree of freedom in the design of the optical system can be increased.

In order to facilitate the understanding of the operation of the above described light projection device of the embodiment of the present invention, the light projection device having an extremely simplified configuration such as the one illustrated in FIG. 4, which is a schematic diagram illustrating a portion of the light projection device according to the embodiment of the present invention in a simplified manner, will be described.

When the light emitting element (Sc) is a semiconductor laser that emits light with an active region that can be regarded substantially as a point light source, this active region serves as the first light radiation region (Gs).

On the other hand, the dynamic light deflection unit (Md) is assumed to be a galvanometer configured such that an axis of rotation (Mrax) of a reversing (or reverse) rotational driving body (Mgal) lies on a reflective surface of a deflection mirror (Mdm). And the first optical system (Eu) is assumed to have a configuration that images the second light radiation region (Gu), which is a point image conjugate to the first light radiation region (Gs), at the axis of rotation (Mrax) of the deflection mirror (Mdm) serving as a deflection point.

In this case, an image point formed by the deflected light beam (Bd) obtained by deflecting the light beam (Bu), which has not yet been deflected, by the deflection mirror (Mdm) serves as the second light radiation region (Gu) that is stationary and does not move even when the deflection mirror (Mdm) rotates as indicated by the arrow (Amr).

However, on the other hand, the principal ray of the deflected light beam (Bd) changes its direction along with the rotation of the deflection mirror (Mdm).

As the second optical system (Ef), assumed is an optical system that images the second light radiation region (Gu), which is the stationary image point formed by the deflected light beam (Bd), at infinity. More specifically, an optical system disposed such that a focal point of a lens system having a positive focal length, such as a plano-convex lens, lies on the second light radiation region (Gu) is assumed. In this case, the light beam (Bf) output from the second optical system (Ef) moves as indicated by the arrow (Amf), as in a principal ray (Lpf') and a light beam (Bf') and a principal ray (Lpf'') and a light beam (Bf'') illustrated in FIG. 4, as the deflection mirror (Mdm) rotates as indicated by the arrow (Amr), with the light beam being maintained in the form of a parallel light beam at all times and with the direction of the principal ray being kept parallel to the z-axis.

As a result, the third light radiation region moves on the light incident portion (Pmi) of the deflection pattern generation unit, as in a third light radiation region (Gf') formed by the light beam (Bf') and a third light radiation region (Gf'') formed by the light beam (Bf'').

It should be noted that the principal ray (Lpf') and the principal ray (Lpf''), which are rays that coincide with the z-axis of the optical system in the upstream side from the dynamic light deflection unit (Md), are deflected by the dynamic light deflection unit (Md) and projected by the second optical system (Ef).

In other words, the principal ray (Lpf') and the principal ray (Lpf'') are projections of the z-axis in the upstream side from the dynamic light deflection unit (Md).

Figure 4:
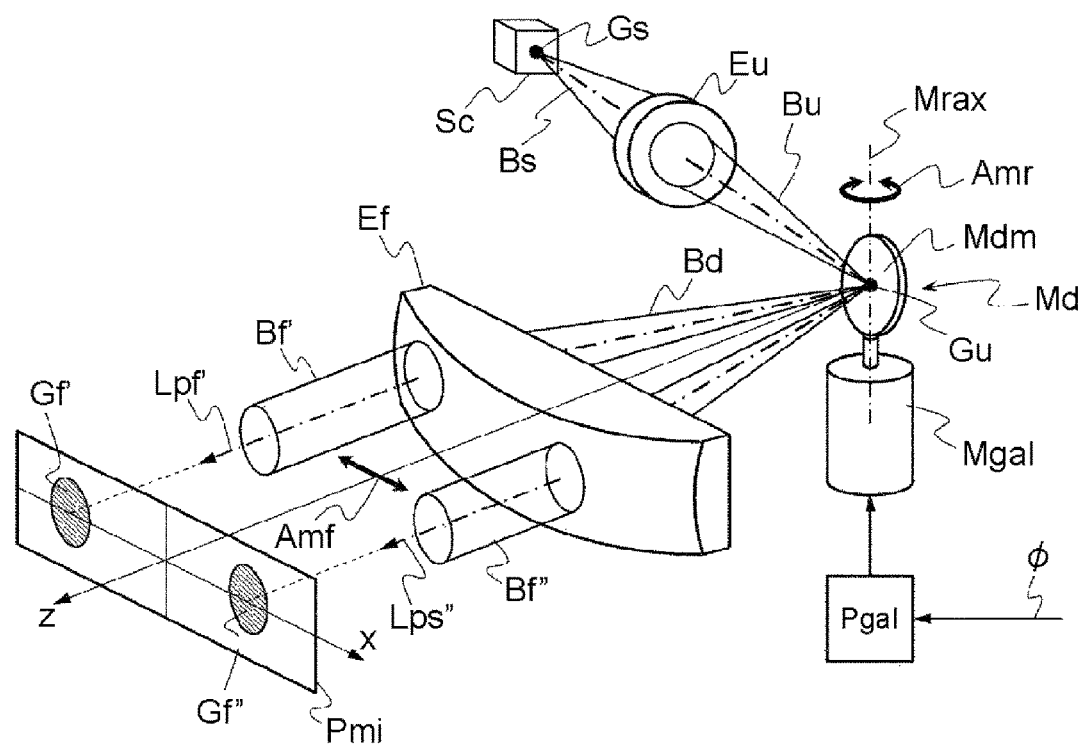
FIG. 4 is a schematic diagram illustrating another portion of the light projection device according to the embodiment of the present invention in a simplified manner.

In the light projection device illustrated in FIG. 4, the second light radiation region (Gu) is conjugate to the first light radiation region (Gs), but the present invention is not limited to this configuration. For example, a configuration illustrated in FIG. 5, which is a schematic diagram illustrating a portion of the light projection device according to another embodiment of the present invention in a simplified manner, can also be employed.

Figure 5:
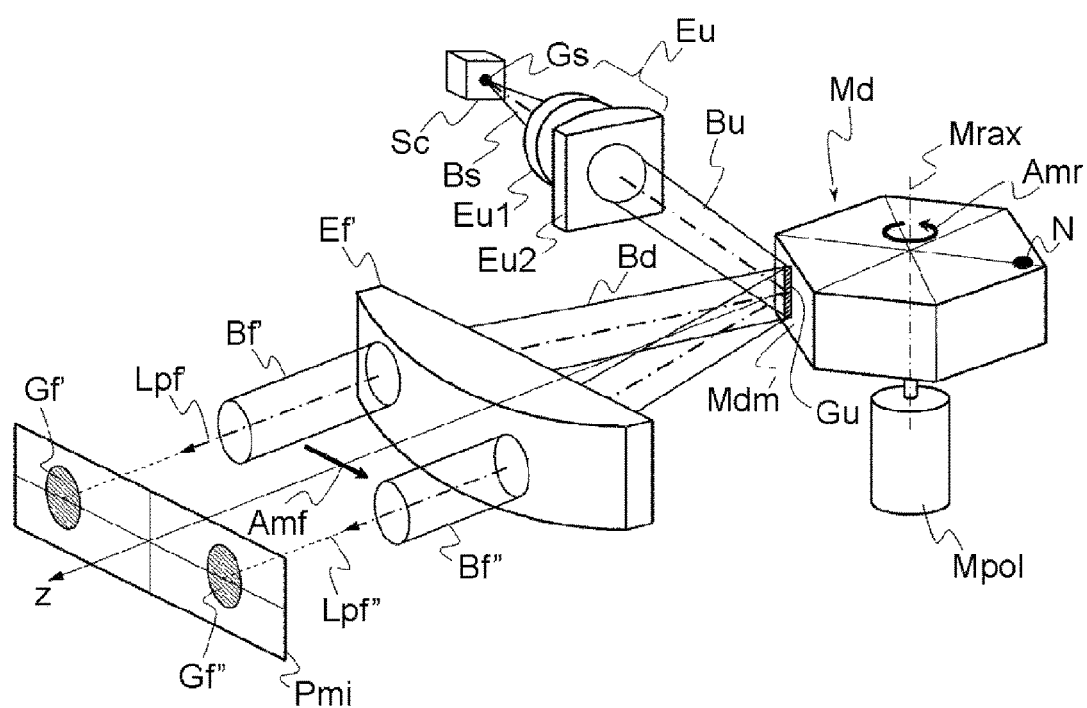
FIG. 5 is a schematic diagram illustrating a portion of the light projection device according to another embodiment of the present invention in a simplified manner.

Roughly speaking, the optical system illustrated in FIG. 5 is a modification to the optical system of FIG. 4. Specifically, the first optical system (Eu) in FIG. 4 is replaced with another first optical system (Eu) that includes a collimator lens (Eu1) and a cylindrical lens (Eu2), the second optical system (Ef) is replaced with a cylindrical lens (Ef'), and the galvanometer serving as the dynamic light deflection unit is replaced with a polygon deflection mirror (Mdm) rotated with a motor (Mpol).

As such, a dot-shaped first light radiation region (Gs) of the light emitting element (Sc) is once converted to an infinity image, i.e., a parallel light beam (light flux), by the collimator lens (Eu1), and then a line-shaped second light radiation region (Gu) is generated on the axis of rotation (Mrax) of the deflection mirror (Mdm) by the cylindrical lens (Eu2) having a positive power only within a plane perpendicular to the axis of rotation (Mrax) of the deflection mirror (Mdm).

Then, the deflected light beam (Bd) is collimated within a plane perpendicular to the axis of rotation (Mrax) by the cylindrical lens (Ef') having a positive power only within a plane perpendicular to the axis of rotation (Mrax).

With this configuration, the rays in the optical system portion spanning from the exit of the collimator lens (Eu1) to the light incident portion (Pmi) of the deflection pattern generation unit (Fm) all seem to be parallel rays when viewed from the direction perpendicular to the axis of rotation (Mrax).

The second light radiation region (Gu) is stationary even in the deflected light beam (Bd) that has been deflected by the deflection mirror (Mdm). Thus, in a similar manner to the configuration illustrated in FIG. 4, the light beam moves as indicated by the arrow (Amf), as in the light beam (Bf') and the light beam (Bf''), as the deflection mirror (Mdm) rotates as indicated by the arrow (Amr), with the light beam being maintained in the form of the parallel light beam at all times and with the direction thereof being kept parallel to the z-axis, and the third light radiation region moves on the light incident portion (Pmi).

The light projection device illustrated in FIG. 4 and the light projection device illustrated in FIG. 5 are the same in terms of the third light radiation region (Gf) formed on the light incident portion (Pmi) of the deflection pattern generation unit (Fm) or the operation thereof. However, the dot-shaped second light radiation region (Gu) is formed on the reflective surface of the deflection mirror (Mdm) in the light projection device illustrated in FIG. 4, and thus the light projection device illustrated in FIG. 4 suffers from shortcomings that it is susceptible to an influence of dust or a defect such as scratches that may be present on the reflective surface of the deflection mirror (Mdm). In contrast, the line-shaped second light radiation region (Gu) is generated on the reflective surface of the deflection mirror (Mdm) in the light projection device illustrated in FIG. 5, providing an advantage that it is less susceptible to an influence of such a defect.

As a galvanometer is used in the light projection device illustrated in FIG. 4, it is in principle possible to keep the second light radiation region (Gu) of the deflected light beam (Bd) strictly stationary. However, since a polygon mirror is used in the light projection device illustrated in FIG. 5, the second light radiation region (Gu) of the deflected light beam (Bd) is not stationary in a strict sense. Thus, the reflective surface of the deflection mirror moves backward and/or forward along with the rotation of the deflection mirror, and the second light radiation region (Gu) also moves backward and/or forward correspondingly.

In an actual light projection device, however, the divergence angle of the deflected light beam (Bd), i.e., NA, can be made sufficiently small, and thus it is possible to substantially eliminate an influence of the backward/forward movement of the second light radiation region (Gu).

In the light projection device of FIG. 4, a case in which the first light radiation region (Gs) is constituted by a single dot-shaped emission region is assumed as the simplest configuration. On the other hand, when the first light radiation region (Gs) is constituted by a plurality of light emission regions, a plurality of regions corresponding to the respective emission regions are formed in the third light radiation region (Gf) projected on the light incident portion (Pmi) of the deflection pattern generation unit (Fm).

The regions to be formed may take any one of the three modes: a mode in which the regions are separated from each other; a mode in which the regions overlap one another; and a mode in which the regions partially overlap one another and are incompletely separated. Which mode will be taken depends on the structure of the optical system spanning from the first light radiation region (Gs) to the second optical system (Ef).

Among these modes, the mode in which the regions formed to correspond to the respective emission regions of the first light radiation region (Gs) overlap one another can provide an advantage that the size of the third light radiation region (Gf) is reduced. Thus, the guiding principle in designing the optical system that generates the third light radiation region (Gf) of this mode will be described with reference to FIG. 6, which is a conceptual diagram illustrating a portion of the light projection device according to an embodiment of the present invention in a simplified manner.

Figure 6:
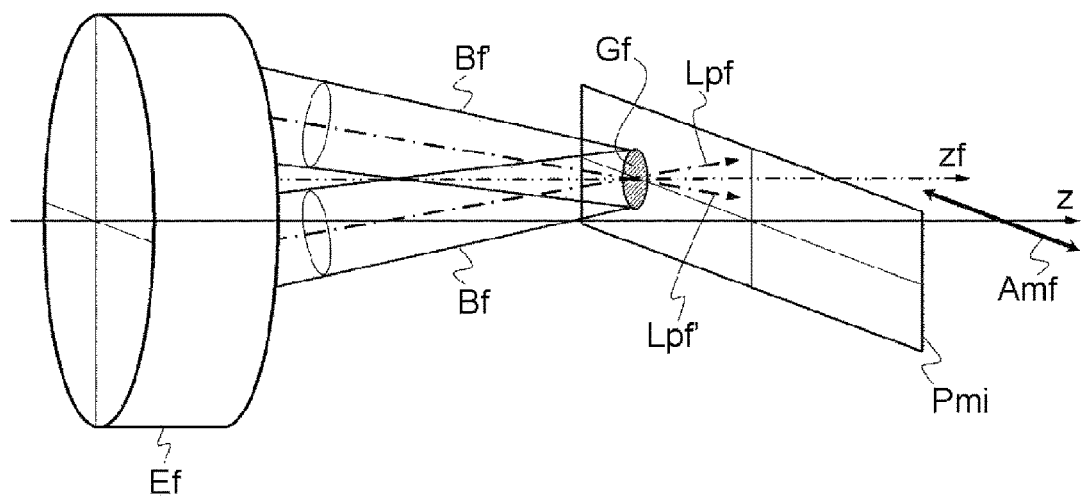
FIG. 6 is a conceptual diagram illustrating a portion of the light projection device according to the embodiment of the present invention in a simplified manner.

FIG. 6 depicts a state in which a light beam that forms the radiation plane elements (Ks, Ks', . . . ) of the first light radiation region (Gs) is incident to the optical system and passes through the first optical system (Eu), the dynamic light deflection unit (Md), and the second optical system (Ef). Then, the light beam, which has been the principal rays (Lps, Lps', . . . ) as illustrated in FIG. 2, for example, in the space of the first light radiation region (Gs), becomes the principal rays (Lpf, Lpf', . . . ) that pass through the vicinity of the center of the third light radiation region (Gf).

Similar to the configuration illustrated in FIG. 4, the first optical system (Eu) images the second light radiation region (Gu) that is conjugate to the first light radiation region (Gs) at the axis of rotation (Mrax) of the deflection mirror (Mdm) serving as the dynamic light deflection unit (Md), and the second optical system (Ef) images the second light radiation region (Gu) at infinity.

Therefore, the optical axis of the optical system lies on the z-axis, but a zf-axis, which is the center axis of the third light radiation region (Gf) or of the light beams (Bf, Bf') forming the third light radiation region (Gf), is an axis obtained by deflecting the z-axis of the optical system in the upstream side from the dynamic light deflection unit (Md) by the dynamic light deflection unit (Md) and by projecting the resulting axis by the second optical system (Ef). As described in relation to FIG. 4, the zf-axis moves along with the deflection operation of the dynamic light deflection unit (Md) while remaining parallel to the z-axis.

In this manner, the optical system in which the principal rays (Lpf, Lpf', . . . ) pass through the vicinity of the center of the third light radiation region (Gf) can be provided by designing such that the exit pupil of the second optical system (Ef) is formed in the third light radiation region (Gf).

To that end, the optical system is preferably designed such that, when the image of the pupil in the space of the first light radiation region (Gs) is projected as an exit pupil (Quo) by the first optical system (Eu), the exit pupil (Quo) is conjugate to the third light radiation region (Gf).

As described above, that the exit pupil (Quo) of the first optical system (Eu) and the third light radiation region (Gf) are conjugate to each other means that the third light radiation region (Gf) is formed as an output image through the imaging function of the second optical system (Ef) that takes, as an input image, the image of the exit pupil (Quo) introduced via the dynamic light deflection unit (Md).

When designing, a case in which the deflection angle of the dynamic light deflection unit (Md) is zero degrees may be used as a basic configuration.

In the example shown in FIG. 6, the output image imaged by the second optical system (Ef) so as to correspond to the radiation plane elements (Ks, Ks', . . . ) of the first light radiation region (Gs) is depicted as an image at infinity or at a far side equivalent thereto.

In order to achieve an optical system of which output image point is located at a far side in this manner, the optical system may be designed such that the image of the first light radiation region (Gs) is formed in the vicinity of the input side focal plane of the second optical system (Ef), and this can be implemented along with the design that enables the exit pupil of the second optical system (Ef) to be formed in the third light radiation region (Gf) as described above.

Now, the accuracy with which the third light radiation region should be conjugate to the exit pupil (Quo) will be discussed more in detail. Even if the position at which a region conjugate to the exit pupil (Quo) is formed is slightly offset to the front or to the back from a reference (the light incident portion (Pmi) of the deflection pattern generation unit (Fm)), no problem arises as long as there is no shift or expansion over the light incident portion (Pmi) in association with an increase in the size of the third light radiation region (Gf) caused by such an offset or as long as a decrease in the utilization efficiency of light caused by the shift, if any, is within a permissible range.

In FIG. 1, the exit pupil (Quo) of the first optical system (Eu) is depicted to be located downstream from the first optical system (Eu) for convenience. It should be noted that the exit pupil (Quo) may be a virtual image, and the geometrical optical position thereof may be inside the first optical system (Eu) or upstream from the first optical system (Eu).

Likewise, although the exit pupil (Quo) is depicted to be located upstream from the second light radiation region (Gu) in FIG. 1, the exit pupil (Quo) may be formed downstream from the second light radiation region (Gu).

As described in relation to FIGS. 4 and 6, it is preferable that the first optical system (Eu) be configured such that the second light radiation region (Gu) formed in the vicinity of the deflection point of the dynamic light deflection unit (Md) is conjugate to the first light radiation region (Gs).

A first reason why this is preferable is as follows. As a region through which the entire light input to the first optical system (Eu) passes, the first light radiation region (Gs) is a small region, and thus the second light radiation region (Gu) can be made small, as it is set to be a region conjugate to the first light radiation region (Gs).

With this configuration, the size of the dynamic light deflection unit (Md) necessary for deflecting the light beam (Bu) can also be made small.

A second reason why this is preferable is as follows. Since the second light radiation region (Gu) is conjugate to the first light radiation region (Gs), an image formed at a far side by the second optical system (Ef) is conjugate to the second light radiation region (Gu). The second light radiation region (Gu) is disposed in the vicinity of the dynamic light deflection unit (Md), and thus the second light radiation region (Gu) is kept substantially stationary even through the deflection operation of the dynamic light deflection unit (Md). Therefore, the image formed at a far side by the second optical system (Ef) can also be kept substantially stationary.

A special advantage is provided when a plurality of emission regions constituting the first light radiation region (Gs) are formed by light beams from a plurality of light emitting elements (Sc1, Sc2, . . . ) and the light beams (Bf, Bf') are formed to correspond to the respective light emitting elements (Sc1, Sc2, . . . ).

When two or more light emitting elements (Sc1, Sc2, . . . ) are provided in this manner, the quantity of light of the exit light beam (Bmo) increases by the number of the provided light emitting elements. When one of the light emitting elements experiences a failure and ceases to emit light, this causes inconvenience in that the luminous intensity decreases by that amount. However, it is important that not all of the functions as the light projection device are lost completely.

This feature is extremely advantageous in terms of the safety especially when this light projection device is applied to a head lamp for a vehicle.

Conventionally, a head lamp for a vehicle (or an on-vehicle head lamp) provides illumination while switching between two types of light distribution areas, namely, a high beam and a low beam.

More specifically, a light distribution area is divided into a close range portion, an intermediate range portion, and a long range portion when viewed vertically, and is divided into a left side, a front side, and a right side when viewed horizontally, and appropriate combinations of these sub areas can provide appropriate light distribution. Ideally, however, it is desirable that the light distribution area is divided finer to provide fine light distribution.

Figure 7:
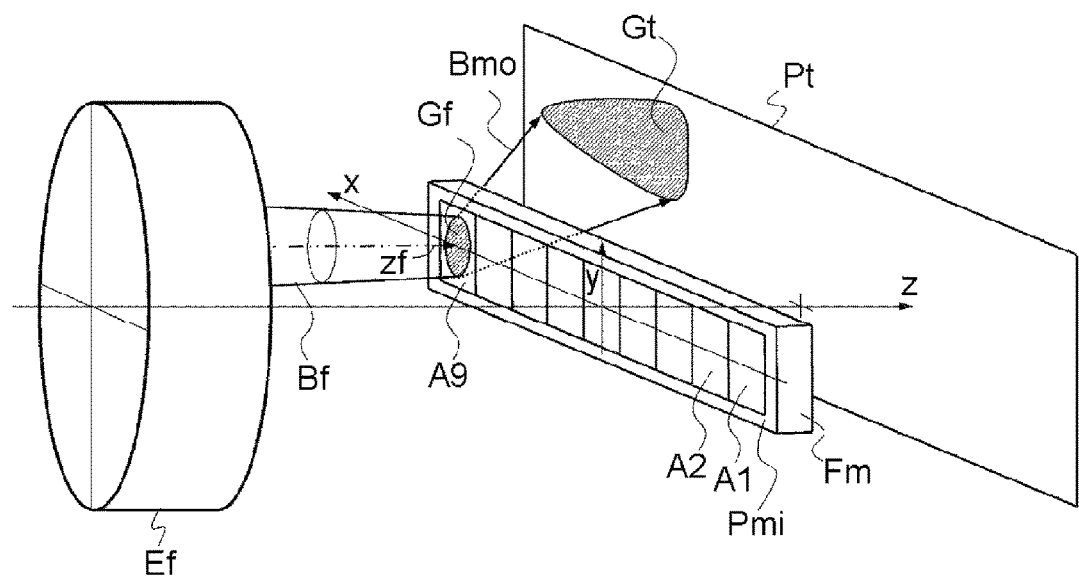
FIG. 7 is a conceptual diagram illustrating the portion of the light projection device according to the embodiment of the present invention in a simplified manner.

FIG. 7 is a conceptual view in which a portion of a light projection device according to the present invention is illustrated in a simplified manner. As shown in FIG. 7, when the light projection device according to the present invention is applied to a head lamp for a vehicle (or on-vehicle head lamp), the light incident portion (Pmi) of the deflection pattern generation unit (Fm) is divided (partitioned) into a plurality of segments (A1, A2, . . . , A9) corresponding to the light distribution areas, respectively, for example, nine light distribution areas obtainable with a combination of three kinds of light distribution areas in the vertical direction with three kinds of light distribution areas in the horizontal direction.

In the deflection pattern generation unit (Fm), The dependence of the direction of the deflection to be imparted on the position at which the ray is incident on the light incident portion (Pmi) is defined for (with respect to) each of the above mentioned segments (A1, A2, . . . , A9) such that each of the segments illuminates an area in the vicinity of a specified special direction, namely, for example, a first segment illuminates a close range road surface on the right side, a second segment illuminates a close range road surface on the front side, . . . , a ninth segment illuminates a long range (distant or faraway) road surface on the left side. With the dependence of the direction of the deflection to be imparted being so defined, it makes it possible to elaborate a light exit direction of the exit light beam (light flux) (Bmo), in other words, a light distribution (Gt) on a projection place (Pt) at a far side.

Moreover, a position of the third light radiation region (Gf) on the light incidence portion (Pmi) is caused to continuously move along with a dynamic deflection operation (motion) of the dynamic light deflection unit (Md). Thus, it makes it possible for the exit light beam (Bmo) to successively realize the above mentioned light distribution (Gt) to be elaborated.

In FIG. 7, the size (that is, the width) of each of the segments (A1, A2, . . . , A9) is depicted to be larger than the size (that is, the width) of the third light radiation region (Gf) in the moving direction of the third light radiation region (Gf). However, conversely, the size of the segment may be smaller than the size of the third light radiation region (Gf) depending on the circumstance such as the number of divisions of segments being increased.

In this case, the third light radiation region (Gf) is assumed to consistently project light onto the plurality of segments (A1, A2, . . . , A9). Each of segments onto which the light is projected (A1, A2, . . . , A9) forms the defined light distribution with the intensity corresponding to the light power projected onto each segment. In this case, the light distribution in which the plurality of light distributions (Gt) are superimposed is formed on the projection plane (Pt) at the far side.

Subsequently, the ratio of the light distributions formed by respective segments (A1, A2, . . . , A9) are being changed along with the movement of the third light radiation region (Gf).

It should be noted that, when the width of each of the segments (A1, A2, . . . , A9) becomes the utmost smallest, it is possible to constitute the dependence of the direction of the deflection to be imparted on the position at which the ray is incident on the light incident portion (Pmi) such that the dependence substantially and continuously changes in the moving direction of the third light radiation region (Gf).

As described above, the light distribution (Gt) in the vicinity of the specified spatial direction is elaborated with respect to each of the segments (A1, A2, . . . , A9). For this reason, when the third light radiation region (Gf) is formed on the specified segment out of the segments (A1, A2, . . . , A9), it is possible to darken or alternatively lighten the light distribution (Gt) in the vicinity of the specified spatial direction corresponding to the specified segment by applying the modulation such that an input power to the light emitting element (Sc) is decreased or alternatively increased.

As a result, when the light projection device according to the present invention is applied to the head lamp for the vehicle, it is possible to achieve the switching operation between the high beam and the low beam by controlling, when the head lamp for the vehicle is set to the high beam, the power feeding circuit (Ps) such that the quantity of light projected of the third light radiation region (Gf) becomes the defined standard illuminance with respect to all of the segments (A1, A2, . . . , A9), and also controlling, when the head lamp for the vehicle is set to the low beam, the power feeding circuit (Ps) such that the quantity of light projected (projection light) of the third light radiation region (Gf) becomes lowered or zero with respect to all of segments other than segments corresponding to the light distribution constituting the low beam out of the segments (A1, A2, . . . , A9).

In addition, according to the light projection device according to the present embodiment, not only the simple switching operation between the high beam and the low beam, as will be described below in detail, it is possible to carry out a more fine light distribution control in which, for example, only the light distribution that is radiated towards an oncoming vehicle is turned off in order to prevent the glare from occurring in the case of the oncoming vehicle coming, or the light distribution on the left side is increased when turning left.

It should be noted that, however, in order to carry out this kind of modulation control, it is required to provide a scanning position detection unit that detects on which segment the third light radiation region (Gf) is formed out of the segments (A1, A2, . . . , A9), or more generally speaking, that traces the movement of the third light radiation region (Gf) on the light incident portion (Pmi) of the deflection pattern generation unit (Fm), in other words, the current position in the scanning of the third light radiation region (Gf).

As the scanning position detection unit, it is required to select an appropriate configuration depending on the type of the dynamic light deflection unit (Md) to be used.

Figure 8:
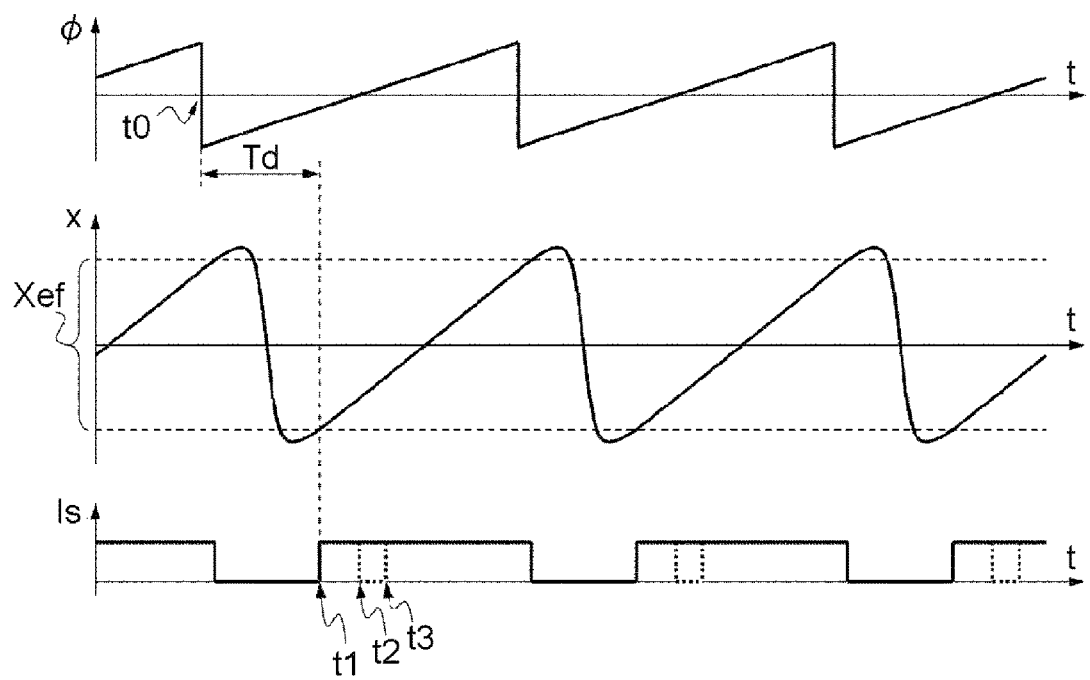
FIG. 8 is a timing chart illustrating an operation of a portion of the light projection device according to the embodiment of the present invention in a simplified manner.

FIG. 8 is a timing chart showing a part of an operation of the light projection device according to the present embodiment in a simplified manner. Referring now to FIG. 8, a certain type of scanning position detection unit will be described below in a case that the dynamic light deflection unit (Md) is the galvanometer shown in FIG. 4.

A phase signal (φ) having a waveform of serrated (saw tooth) shape is sent from a modulation controlling circuit (Ux) of the light projection device according to the present embodiment to a galvanometer driving circuit (Pgal) that drives the reverse rotational driving body (Mgal) of the galvanometer.

The galvanometer driving circuit (Pgal) flows the current that is controlled by the reverse rotational driving body (Mgal) such that the rotational angle of the axis of rotation (Mrax) is proportional to the phase signal (φ). At this moment, however, since the steepness of the rotation to follow the phase signal has limits, the scanning position (x) of the third light radiation region (Gf) on the light incident portion (Pmi) of the deflection pattern generation unit (Fm) becomes delayed behind the phase signal (φ), as shown in FIG. 8.

The value of a starting point delay time (Td) from a phase starting point timing (t0) to an effective starting point timing (t1) of the phase signal (φ) and the value of mobility (movement) of the third light radiation region (Gf) are measured in advance, the effective starting point timing (t1) meaning that the scanning position (x) enters into a scanning effective interval (zone) (Xef) on the light incident portion (Pmi) from outside. With the values so being measured, the modulation control circuit (Ux) is capable of obtaining the scanning position (x) in a way proportional to a largeness of a time count value by starting the time count with being delayed from the phase starting point timing (t0) by the starting point delay time (Td) so as to make it possible to achieve the scanning position detection unit.

As a result, the modulation control circuit (Ux) is capable of achieving an operation for preventing the above mentioned glare by starting the modulation so as to flow the light emitting element current (Is) at the effective starting point timing (t1), and then modulating so as to stop the current at a timing (t2) when, for example, the third light radiation region (Gf) enters into a segment that forms the light distribution radiated towards an ongoing vehicle, and to restart to flow the current at a timing (t3) when the third light radiation region (Gf) exits the segment.

On the other hand, when the dynamic light deflection unit (Md) is the polygon mirror shown in FIG. 5, a rotary encoder capable of detecting a rotational angle is added to the axis of rotation of the motor (Mpol), and the correlation is measured in advance between the rotational angle detected based on an output signal from the rotary encoder and the scanning position (x) of each of reflective planes of the polygon mirror (six planes in a case of the polygon mirror shown in FIG. 5). Thus, the modulation control circuit (Ux) is capable of obtaining the scanning position (x) with the use of the rotational angle detected based on the output signal from the rotary encode so as to achieve the scanning position detection unit.

Furthermore, alternatively, without the rotary encode being used, a starting point detection signal (Jm), which is obtained by detecting, for example, a mark (N) affixed to one location in a peripheral portion on an upper face of the polygon mirror with the reflective type optical sensor (Ms), is configured to be input into the modulation control circuit (Ux), and the relationship is measured in advance for each of the reflective planes of the polygon mirror between the rotational angle position at which the mark (N) is detected and the rotational angle position at the effective starting point of the scanning effective interval. The modulation control circuit (Ux) multiplies the rotational angle of the motor (Mpol) by elapsed time from the time at which the mark (N) is detected as the starting point. As a result, the modulation control circuit (Ux) is capable of obtaining the scanning position (x) with the use of the elapsed time in place of the rotational angle detected based on the output signal from the rotary encoder so as to achieve the scanning position detecting unit as well.

It should be noted that the rotational angle of the motor (Mpol) can be calculated from a cycle for detecting the mark (N). Thus, it is possible to correct the undesired influence of the change in the rotational angle of the motor (Mpol).

Next, another mode will be explained below in which the respective third light radiation regions formed corresponding to a plurality of light radiation regions, respectively, are separated one another in the third light radiation region (Gf) projected onto the light incident portion (Pmi) of the deflection pattern generation unit (Fm), in a case that the first light radiation region (Gs) is constituted by a plurality of light radiation regions and, in particular, the plurality of light emitting regions are formed by a plurality of light emitting elements (Sc1, Sc2, . . . ).

Figure 9:
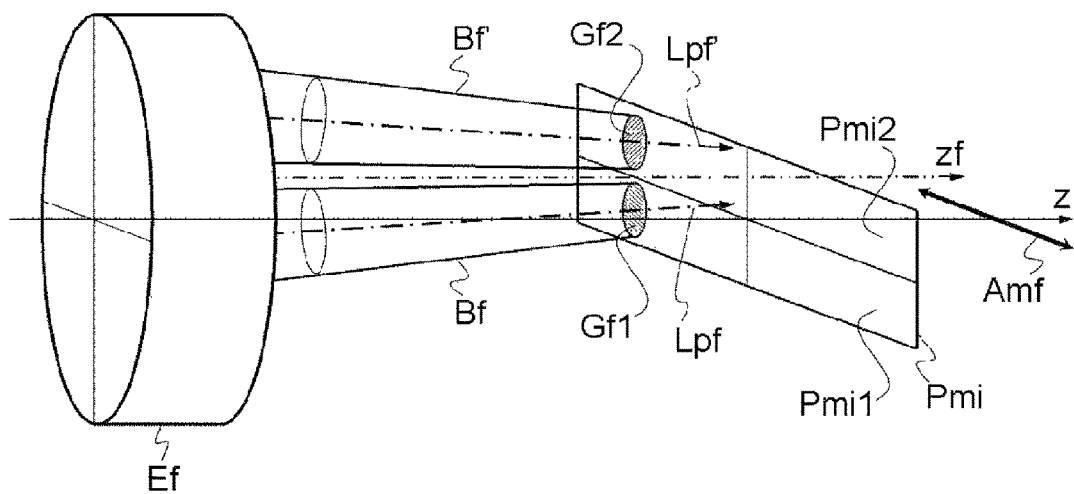
FIG. 9 is a conceptual diagram illustrating a portion of the light projection device according to the embodiment of the present invention in a simplified manner.

FIG. 9 is a conceptual view showing a portion of the light projection device according to the present embodiment in a simplified manner. In FIG. 9, the third light radiation region (Gf) is depicted as two light radiation sub regions (Gf1, Gf2) separated each other.

In connection with the above mentioned mode of the optical system shown in FIG. 6 in which respective third light radiation regions formed corresponding to a plurality of light radiation regions, respectively, of the first light radiation region (Gs) are overlapped one another, a certain guiding principle has been explained in which the optical system is to be designed such that the image of the pupil in the space of the first light radiation region (Gs) becomes conjugate with the third light radiation region (Gf) when the image of the pupil is projected as the exit pupil (Quo) by the first optical system (Eu).

Accordingly, in order to configure the optical system for generating the third light radiation region (Gf) as shown in FIG. 9, it should be understood that the third light radiation region (Gf) is to be designed so as to be largely deviated from the conjugate with the exit pupil (Quo) of the first optical system (Eu).

In this type of optical system, when the zf axis moves as the deflecting operation by the dynamic light deflection unit (Md) advances, then the light radiation sub regions (Gf1, Gf2) scan different light incident sub portions (Pmi1, Pmi2) of the light incident portion (Pmi), respectively.

In this regard, the respective light emitting regions as the respective light sources of the light radiation sub regions (Gf1, Gf2) are different light emitting elements (Sc1, Sc2), to which the modulation can be applied respectively and individually. Thus, the dependence of the direction of the deflection to be imparted on the position at which the ray is incident on the light incident portion (Pmi) is defined and made for each of the segment such that the respective light incident sub portions (Pmi1, Pmi2) are divided into the segments as being explained in connection with FIG. 7, respectively, and each of the segments illuminates a region in the vicinity of the specified spatial direction. As a result, it makes it possible to configure a light projection device capable of generating the light distributions (Gt) onto the projection planes (Pt) at the far side simultaneously in parallel as many as the number of the light emitting elements (Sc1, Sc2, . . . ).

It should be noted that the mode just mentioned here can be used in order to avoid the wavelength dependency to adversely affect in which the respective third light radiation regions formed corresponding to the plurality of light radiation regions of the first light radiation region (Gs), respectively, are separated one another, when, for example, a plurality of light emitting elements are three light source elements emitting light of R, G and B (namely, red, green and blue), respectively, and an action to cause the respective incident light beams to be deflected to output, which is carried out by the deflection pattern generation unit (Fm), depends on the wavelength, in addition to the case in which a plurality of light emitting elements (Sc1, Sc2, . . . ) are independently modulated.

In other words, it is possible to correct the wavelength dependency by forming the light radiation sub regions (the third light radiation sub regions) as being separated into R, G or B color, respectively, providing the light incident sub portions scanned by the light radiation subregions dedicatedly or exclusively for of the respective colors, respectively, and defining the dependence of the direction of the deflection to be imparted on the position at which the ray is incident on the light incident portion (Pmi) dedicatedly in compliance with each of three colors.

The above mentioned deflection pattern generation unit (Fm) deflects and outputs each of the incident light beams incident into the light incident portion (Pmi). For this reason, the direction of deflection to be imparted depends on the position at which the ray is incident on the light incident portion (Pmi). Thus, it is required for the dependence, in other words, the light distribution in the light incident portion (Pmi) of to the direction of deflection to be imparted, to be capable of being designed so as to achieve a desired distribution.

As the deflection pattern generation unit (Fm) that is capable of implementing the above mentioned light distribution, it is preferable to constitute the deflection pattern generation unit with an optical element having a light reflective plane of which the normal line direction (normal direction) changes depending on the position on the light incident portion (Pmi).

In this case, the light reflective plane may constitute one curved surface, in other words, a curved surface of which curvature continuously varies, by the light incident portion (Pmi) as a whole.

Alternatively, when one of the segments (A1, A2, . . . , A9) is observed, the whole segment may be constituted with one curved surface, and a plurality of such segments (A1, A2, . . . , A9) are joined together to constitute the deflection pattern generation unit (Fm).

In addition, when one of the segments (A1, A2, . . . , A9) is observed, the segment may be constituted by joining a plurality of curved surfaces.

Moreover, one of the plurality of curved surfaces is not necessarily required to be smooth in the microscopic sense, but may be constituted by joining a plurality of small planes.

It should be noted that, in the case of this type of the deflection pattern generation unit (Fm), the light incident portion (Pmi) serves as the light exit portion (Pmo).

Yet in addition, it is preferable to constitute the deflection pattern generation unit (Fm) with an optical element having a light refractive medium of which thickness or the refractive index varies depending on the position on the light incident portion (Pmi).

In this case, as for the light refractive medium of which thickness varies, the deflection pattern generation unit (Fm) may be a lens in a broad sense having a refractive surface at the light incident side, which serves as a light incident portion (Pmi), and another refractive surface at the light exit side, which is a light exit portion (Pmo).

Assuming that, for example, the refractive surface at the light exit side is a flat surface, another refractive surface at the light incident side is a curved surface. The curved surface may be constituted as a curved surface of which normal line direction varies depending on the position on the light incident portion (Pmi).

At this moment, the refractive surface at the light incident side may constitute one curved surface, in other words, a curved surface of which curvature continuously varies, with the light incident portion (Pmi) as a whole.

Alternatively, when one of the segments (A1, A2, . . . , A9) is observed, the whole segment may be constituted with one curved surface, and a plurality of segments (A1, A2, . . . , A9) are joined together to constitute the deflection pattern generation unit (Fm).

In addition, when one of the segments (A1, A2, . . . , A9) is observed, the segment may be constituted by joining a plurality of curved surfaces.

Moreover, one of the plurality of curved surfaces is not necessarily required to be smooth in the microscopic sense, but may be constituted by joining a plurality of small planes.

Moreover, alternatively, it is preferable to constitute the deflection pattern generation unit (Fm) with a diffraction grating (or diffractive grating) having an interference fringe of which phase varies depending on the position on the light incident portion (Pmi), in other words, a hologram.

In this case, the type of the diffraction grating is preferably a phase type having a higher diffraction efficiency, in other words, a refractive index modulation type, and more preferably a volume type diffraction grating.

Moreover, the diffraction grating may be the transmissive (transmission) type in which the diffraction light is emitted from a rear side of the light incident plane, or alternatively, the reflective type in which the diffraction light is emitted from the light incident plane.

It should be noted that in some cases it is difficult to fabricate the diffraction grating having a higher diffraction efficiency even when the substantially white colored light in which R, G and B are immixed enters into the diffraction grating, because the function of the diffraction grating is sensitive to the light wavelength.

In those cases, as already mentioned above, in order to prevent the wavelength dependency from adversely affecting, it is effective to form the light radiation sub regions by separating respective colors of R, G and B, and the light incident subregions each scanned by each of the light radiation sub regions are provided dedicatedly for respective colors, respectively.

Although in FIGS. 4 and 5, a certain example has been explained in which the galvanometer and the polygon mirror are employed as the dynamic light deflection unit (Md), any other may be applicable as long as an angle of the light beams (light flux) can be dynamically deflected.

For example, a certain circular mirror may be employed that rotates with the center on a rear face of the circular mirror being fixed to an axis of rotation of a motor. By arranging the circular mirror such that a normal vector of the reflective plane of the mirror inclines by a predetermined angle with respect to the axis of rotation, the locus (trajectory) of the normal vector oscillates such that the locus (trajectory) draws a conical surface as the mirror rotates. Thus, the circular mirror serves as a rotational rocking (oscillation) mirror to function as the dynamic light deflection unit.

It should be noted, however, when the light beams (Bu) from the first optical system (Eu) is deflected by the dynamic light deflection unit, more particularly, when, for example, the deflection mirror (Mdm) of the galvanometer type shown in FIG. 4 is replaced with this type of dynamic light deflection unit, the locus (trajectory) of the movement of the third light radiation region (Gf) on the light incident portion (Pmi) of the deflection pattern generation unit (Fm) draws an elliptical shape.

As a result, when the segments (A1, A2, . . . , A9) as shown in FIG. 7 are arranged, the segments may be arranged along the locus (trajectory) of the elliptical shape.

In addition, a rotational non-parallel glass plate, which rotates the glass plate having a section of wedge shape, may be applicable as the dynamic light deflection unit, similarly to the above mentioned rotational oscillating mirror.

Although the galvanometer is depicted to be driven by a waveform of serrated shaped wave (saw tooth wave) in FIG. 8, alternatively, the galvanometer may be driven by a waveform of triangular wave or sine wave so as to eliminate a wasting (idle) time associated with a return of the deflection.

Figure 10:
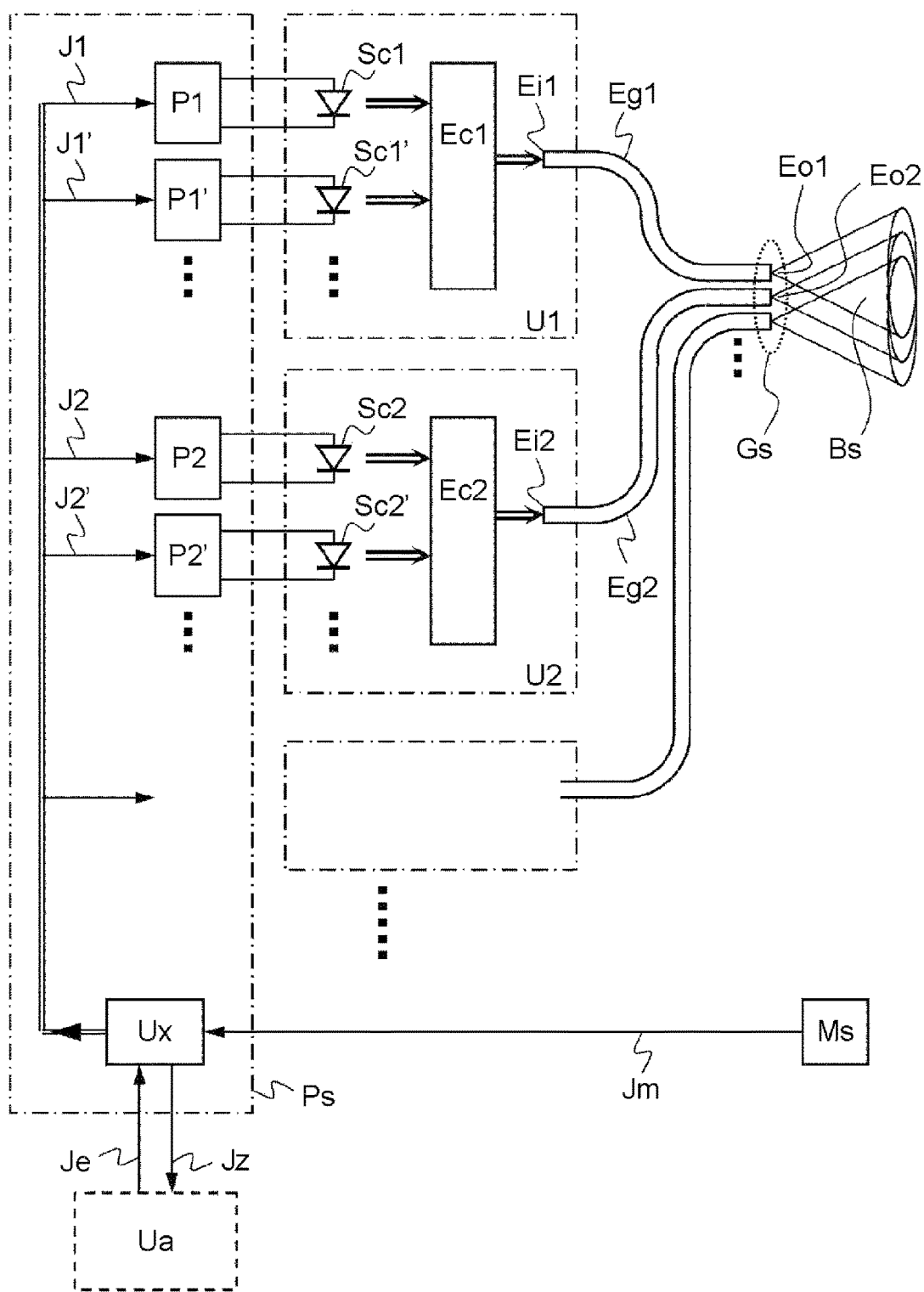
FIG. 10 is a schematic diagram illustrating a portion of a head lamp for a vehicle according to an embodiment of the present invention in a simplified manner.

FIG. 10 is a conceptual view showing a portion of a head lamp for a vehicle according to the present invention, which is an apparatus to which the light projection device according to the present invention is applied, in a simplified manner. Referring now to FIG. 10, a further embodiment according to the present invention will be described below.

Light emitting elements (Sc1, Sc1', . . . , Sc2, Sc2', . . . ), which is incorporated within light source elements (U1, U2, . . . ) provided corresponding to the wavelength bands of R, G and B, respectively, are driven by driver circuits (P1, P1', . . . , P2, P2', . . . ) of the power feeding circuit (Ps) to emit light.

It should be noted that here each of the light emitting elements (Sc1, Sc1', . . . , Sc2, Sc2', . . . ) may be a semiconductor laser or alternatively a light source that wavelength-converts the radiated light from the semiconductor laser using the non-linear optical phenomenon such as the harmonic generation or an optical parametric effect or the like. A plurality of such types of light sources may be connected in series, connected in parallel, or otherwise connected in series-parallel or the like, so as to be driven by one of the driver circuits (P1, P1', . . . , P2, P2', . . . ).

Moreover, here the drive circuit (P1, P1', . . . ) is a DC/DC converter that is fed by a direct-current (DC) power source (not shown) and constituted by, for example, a circuit of step-down chopper or a step-up chopper or the like. The driver circuit is configured to be capable of inputting a specified power to the light emitting elements (Sc1, Sc1', . . . ).

The modulation control circuit (Ux) is configured to transmit and receive data individually to/from each of the driver circuits (P1, P1', . . . , P2, P2', . . . ) with the use of the driver circuit control signals (J1, J1', . . . , J2, J2', . . . ) to control the driver circuits, input the specified power to each of the light emitting elements (Sc1, Sc1', . . . , Sc2, Sc2', . . . ) and modulate the light emitting elements, respectively.

Emitted light from the light emitting elements (Sc1, Sc1', . . . , Sc2, Sc2', . . . ), each provided dedicatedly to each wavelength band of R, G or B, of the light source elements (U1, U2, . . . ) is condensed at incident ends (Ei1, Ei2, . . . ) of the optical fibers (Eg1, Eg2, . . . ) by light condensing systems (Ec1, Ec2, . . . ) each composed of, for example, a lens, and propagates in the core of the optical fibers (Eg1, Eg2, . . . ) to radiate from the exit ends (Eo1, Eo2, . . . ), respectively.

It is possible to implement the first light radiation region (Gs) by arranging the exit ends (Eo1, Eo2, . . . ) of the optical fibers (Eg1, Eg2, . . . ) to be positioned on the same plane, and bundling the exit ends of the optical fibers (Eg1, Eg2, . . . ), respectively.

The radiated light beams from the exit ends (Eo1, Eo2, . . . ) are integrated (consolidated) to form one output light beam (light flux), outputted as the light beam (Bs), and the light beam (Bs) enters into the optical system configured by, for example, first optical system (Eu) and subsequent components shown in FIG. 5.

In the third light radiation region (Gf) projected onto the light incident portion (Pmi) of the deflection pattern generation unit (Fm), how the third light radiation regions corresponding to respective exit ends (Eo1, Eo2, . . . ) of the optical fiber (Eg1, Eg2, . . . ) are formed, in other words, whether the respective third light radiation regions are overlapped as shown in FIG. 6 or otherwise separated as shown in FIG. 9, depends on the position of the exit pupil of the optical system as described above. Accordingly, the optical system is required to be designed by selecting an appropriate mode depending on the circumstances.

When the deflection pattern generation unit (Fm) is an optical element having a light reflective plane of which normal line direction changes depending on the position on the light incident portion (Pmi), the characteristics of the optical element does not depend on the wavelength of light. Likewise, when the deflection pattern generation unit (Fm) is an optical element having a light refractive medium of which thickness or the refractive index varies depending on the position on the light incident portion (Pmi), the characteristics of the optical element is less likely to depend on the wavelength of light. For this reason in those cases, it is preferable to select a mode in which the third light radiation regions are overlapped.

On the other hand, when the deflection pattern generation unit (Fm) is a diffraction grating having an interfering fringe of which phase varies depending on the position on the light incident portion (Pmi), in other words, the hologram, the characteristics of the diffraction grating depends on the wavelength of light so that it is preferable to select a mode in which the regions are separated one another.

As described above, into the modulation control circuit (Ux), the starting point detection signal (Jm) is input, which is obtained by detecting the mark (N) added to the polygon mirror, which constitutes apart of the scanning position detection unit, by the reflective type optical sensor (Ms).

For this reason, the modulation control circuit (Ux) in FIG. 10 is capable of recognizing the scanning position (x) of the third light radiation region (Gf) on the light incident portion (Pmi) of the deflection pattern generation unit (Fm) according to the above mentioned manner. Thus, the modulation control circuit (Ux) is capable of applying the modulation to the light emitting elements such that the input power is decreased or increased to the light emitting elements (Sc) when the third light radiation region (Gf) is formed on the specified segment out of segments (A1, A2, . . . , A9) as described above, by controlling the drive circuits (P1, P1', . . . , P2, P2', . . . ) with the use of the driver circuit control signals (J1, J1', . . . , J2, J2', . . . ) and applying the modulation to respective light emitting elements (Sc1, Sc1', . . . , Sc2, Sc2', . . . ), respectively. As a result, the modulation control circuit (Ux) is capable of darken or lighten the light distribution (Gt) in the vicinity of the specified spatial direction corresponding to the specified segment.

Figure 11:
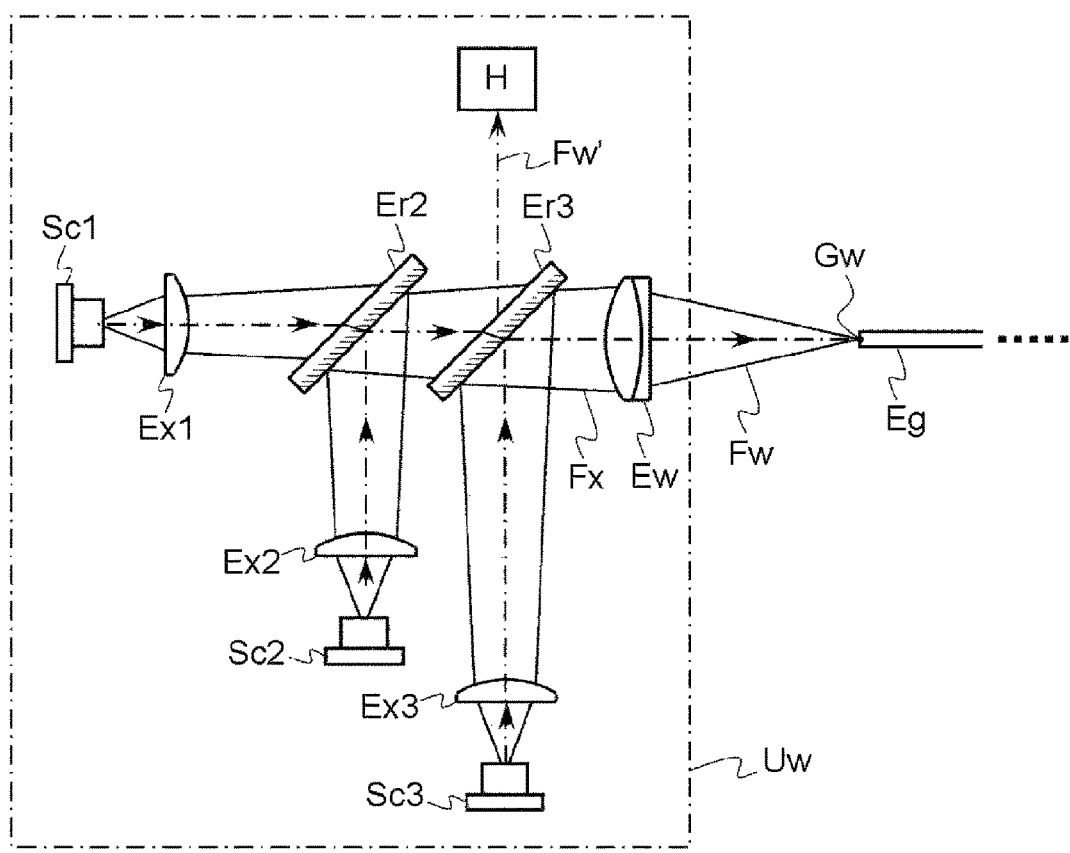
FIG. 11 is a schematic diagram illustrating another portion of the head lamp for a vehicle according to the embodiment of the present invention in a simplified manner.

In the optical system shown in FIG. 10, the optical system is depicted to have three optical fibers each corresponding to the wavelength band of R, G or B. However, alternatively, as shown in FIG. 11, which is a conceptual view showing a portion of another head lamp for a vehicle according to the present invention in a simplified manner, a dichroic mirror may be employed to synthesize the light beams of respective wavelength bands of R, G and B to form the substantially white colored light beam, and the light (substantially white colored light) is transmitted through one optical fiber. Hereinafter, a configuration of such mode will be described.

Light emitting elements (Sc1, Sc2, Sc3) of a semiconductor laser are arranged such that light radiation portions of the radiated light, which is present on surfaces of respective semiconductor chips, coincide with respective focal points of collimator lenses (Ex1, Ex2, Ex3). Accordingly, the radiated light beams from respective light emitting elements (Sc1, Sc2, Sc3) are converted into substantially parallel light beams, respectively.

Assuming that the light emitting element (Sc1) emits the R color, the light emitting element (Sc2) emits the G color, and the light emitting element (Sc3) emits the B color, respectively, the substantially parallel light beams are respectively superimposed through a dichroic mirror (Er2), which allows the R color to transmit and reflects the G color, and a dichroic mirror (Er3), which allows the R color and G color to transmit and reflects the B color. Accordingly, as the light beams (Fx) becomes the substantially white colored light beam into which the R, G and B colors are synthesized, it makes it possible to obtain a substantially white colored focused light beam (light flux) (Fw) to form a substantially white colored light condensing region (Gw) by allowing the substantially white colored light beam to pass through a light condensing lens (Ew).

By arranging the optical fiber (Eg) such that the substantially white colored light condensing region (Gw) is formed on the incident end of the optical fiber, the exit end of the optical fiber (Eg) functions as alight radiation region of the substantially white colored light. As a result, it makes it possible to arrange the exit end of the optical fiber as the first light radiation region (Gs) in FIG. 1, in other words, the first light radiation region (Gs) in FIGS. 4 and 5.

It should be noted that a light quantify monitor may be configured by sensing (receiving), by an optical sensor (H), a light beam (light flux) (Fx') composed of reflecting light of the R color and G color and transmitted light of the B color through the dichroic mirror (Er3).

Needless to say, the optical system (Uw) for synthesizing the substantially white colored light using the dichroic mirror may be also applicable to the case in which a light projection device without the optical fiber being used is to be constituted.

In other words, in this case, the substantially white colored light condensing region (Gw) formed by the optical system for synthesizing the substantially white colored light may be arranged as the first light radiation region (Gs) in FIGS. 4 and 5.

Moreover, even when an optical system using three lines of optical fibers is employed, the substantially white colored light condensing region (Gw) may be similarly formed by preparing an optical system in which the light emitting elements (Sc1, Sc2, Sc3) are eliminated from the optical system for synthesizing the substantially white colored light, and arranging the three optical fibers such that the exit ends (Eo1, Eo2, . . . ) of the optical fibers (Eg1, Eg2, . . . ) coincide with the focal points of the collimator lenses (Ex1, Ex2, Ex3), respectively, in place of bundling the exit ends (Eo1, Eo2, . . . ) of the optical fibers (Eg1, Eg2, . . . ). Thus, the substantially white colored light condensing region (Gw) formed may be arranged as the first light radiation region (Gs) in FIGS. 4 and 5.

It should be noted that an advantage in using the optical system for synthesizing the substantially white colored light (Ux) to which the dichroic mirror is added is, by using this, that the first light radiation region (Gs) can be composed solely of a single substantially white colored region.

Otherwise when the first light radiation region (Gs) is composed of the light radiation regions separated into R, G and B, microscopic differences remain in the angle of the light beam that forms the regions corresponding to respective light radiation regions in the third light radiation region (Gf) projected onto the light incident portion (Pmi) of the deflection pattern generation unit (Fm). Thus, although such differences may be possibly present as a microscopic separation in color, it is possible to eliminate this phenomenon by using the optical system for synthesizing the substantially white colored light (Ux).

It should be noted that the separation in color on the projection plane at the far side (Pt) as mentioned above can be reduced by densely or thickly bundling the exit ends (Eo1, Eo2, . . . ) of the optical fiber as far as possible. Thus, whether the optical system for synthesizing the substantially white colored light (Uw) is employed or not may be determined depending on the degree of separation of the color to be attained.

Figure 12:
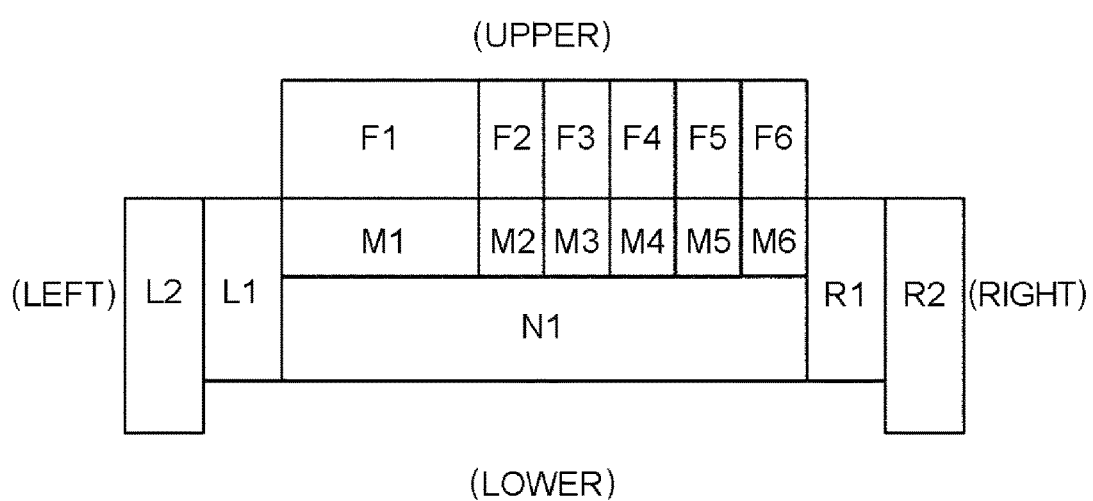
FIG. 12 is a conceptual diagram illustrating a portion of the head lamp for a vehicle according to the present invention in a simplified manner.

FIG. 12 is a conceptual view in which a portion of a head lamp for a vehicle is shown in a simplified manner. FIG. 12 shows an example of the light distribution (Gt) on the above mentioned projection plane at the far side (Pt) in the case of left hand traffic.

FIG. 12 corresponds to a field of view (eyesight) of a driver viewed from the driver's seat, more particularly, an upper side in FIG. 12 corresponds to a upper side of the field of view, that is, a far side, a lower side corresponds to a lower side of the field of view, that is a front side, a left side corresponds to a left side of the field of view, and a right side corresponds to a right side of the field of view, respectively. It is configured to be capable of controlling the light distribution by dividing (partitioning) into long range light distribution regions (F1, F2, . . . , F6) and intermediate range light distribution regions (M1, M2, . . . , M6), a short range light distribution region (N1), left side additional light distribution regions (L1, L2) and right side additional light distribution regions (R1, R2).

It should be noted that a main system of the vehicle main body (Ua), which is an external apparatus into which the head lamp for the vehicle according to the present embodiment is incorporated, is capable of setting the light distribution by transmitting a light distribution instruction signal (Je) to the head lamp for the vehicle.

During a normal so-called high beam running, the light distribution is in a state that all of the long range light distribution regions (F1, F2, . . . , F6) and the intermediate range light distribution regions (M1, M2, . . . , M6), and short range light distribution region (N1) are illuminated, while the left side additional light distribution regions (L1, L2) and the right side additional light distribution regions (R1, R2) are turned off or darken.

However, when the main system (Ua) detects an oncoming vehicle at a position corresponding to, for example, the long range light distribution region (F3), the main system (Ua) transmits the light distribution instruction signal (Je) to instruct to turn off the illumination of the long range light distribution region (F3) or otherwise to correspond to the light distribution that is to be darken. Then, as the oncoming vehicle is approaching and therefore the relative position of the oncoming vehicle is being moved from the long range light distribution region (F4) to the long range light distribution region (F6), the main system (Ua) is capable of carrying out the lighting control, with the use of the light distribution instruction signal (Je), to turn off the illumination of only light distribution region instructed or otherwise switch to the darken light distribution.

In addition, the above mentioned lighting control is also achievable even when a plurality of oncoming vehicles are present. For the above mentioned reason, it makes it possible to provide a sufficient illumination onto a light distribution region that is not required to be turned off, while achieving the prevention of the glare with respect to the oncoming vehicle, so as to improve the safety.

Yet also, in this regard, when the main system (Ua) recognizes the moisture (wetness) on the road surface, in order to reduce the glare with respect to the oncoming vehicle due to the reflected light from the road surface as well, it is possible to simultaneously carry out the lighting control of the intermediate range light distribution regions (M2, M3, . . . , M6) as well as the lighting control of the above mentioned long range light distribution regions (F2 F3, . . . , F6).

Yet furthermore, when, for example, turning to the left, based on the light distribution instruction signal (Je) from the main system (Ua), the left side additional light distribution region (L1), or the left side additional light distribution regions (L1, L2) if the curvature of the left turn is larger, is lighten. Similarly, when turning to the right, the right side additional light distribution regions (R1, R2) are lighten. As a result, the higher safety can be achieved.

Yet furthermore, the headlamp for the vehicle according to the present embodiment is provided with the light source elements (U1, U2, . . . ) each corresponding to the wavelength band of R, G or B, and capable of independently controlling the luminous intensity of each of the light source elements. For this reason, when the main system (Ua) detects, for example, the rain or fog, in order not to intercept the field of view of the driver due to the light scattering caused by aqueous droplets drifting in the air, it is possible to shift the spectrum of the projection color from the white color to the longer wavelength side, and further control the shift amount so as to be an appropriate value depending on the degree of the rain or fog.

As a matter of course, it is possible for the main system (Ua) to distinguish a street road provided with a street lamp from a country road completely absent of illuminations to adjust the projection amount as a whole.

Preferably, the modulation control circuit (Ux) of the power feeding circuit (Ps) for implementing the head lamp for the vehicle according to the present embodiment is configured to include a lookup table which uses a memory in which a memory area address is assigned to each of the segments (A1, A2, . . . , A9).

In this regard, the main system (Ua) is required to write in advance to all addresses of the lookup table the illuminance (or luminance) information of the light distribution region formed by the projected light onto the segment (A1, A2, . . . , A9) indicated by each of the address, respectively. The main system (Ua) is also required to keep updating the illuminance information to the most appropriate information from moment to moment.

The illuminance information becomes 12 bit data, i.e., 4 bits multiplied by 3 colors, thus 2 byte data per address, when the 16 step (gradation) luminance variation is to be available for each of R, G and B.

The scanning position detection unit is as previously mentioned above which detects the scanning position of the third light radiation region (Gf) on the light incident portion (Pmi) of the deflection pattern generation unit (Fm) in association with the deflection by the dynamic light deflection unit (Md) such as the galvanometer or the polygon mirror or the like. In this regard, here, the scanning position information generated by the scanning position detection unit may be a timing measurement value or otherwise an output value from the rotary encoder, whichever is generated as a digital value.

Accordingly, by converting this numerical information into the address value in the lookup table, and reading out data stored in the corresponding address in the lookup table, the modulation control circuit (Ux) is capable of obtaining the illuminance information for each of the light emitting element of R, G or B color, which is requested from the main system (Ua) with respect to the segment (A1, A2, . . . , A9) that is being scanned by the third light radiation region (Gf) at that point. As a result, the modulation control circuit (Ux) is capable of modulating the light intensity of the light emitting elements (Sc1, Sc1', . . . , Sc2, Sc2', . . . ) based on the illuminance information by controlling the driver circuits (P1, P1', . . . , P2, P2', . . . ) with the use of the driver circuit control signals (J1, J1', . . . , J2, J2', . . . ).

It should be noted that the above mentioned modulation control may be configured, for example, to flow the current proportional to the obtained value of the illuminance information. Alternatively, the modulation control may be configured to feedback control the current flowing to the light emitting element such that the detection value of the optical sensor becomes proportional to the obtained value of the illuminance information while sensing the amount of luminescence of the light emitting element.

In the meantime, as previously mentioned above, the lighting control may be implemented even when a plurality of oncoming vehicles are present. This is because the lookup table is capable of holding data independently with respect to each of the segments (A1, A2, . . . , A9).

It is preferable that a majority of functions of the modulation control circuit (Ux), which have been mentioned above, is implemented by a microprocessor, namely, the functions such as a data writing process to the lookup table based on the instruction from the main system (Ua) with the use of the light distribution instruction signal (Je); a scanning position (x) determining process with the use of the above mentioned elapsed time by the scanning position detection unit; a converting process from the scanning position (x) to an address value in the lookup table; and data reading process from the lookup table and the like.

In this regard, the lookup table may be implemented by assigning data to a part of memory area provided in the microprocessor.

Although the light distribution regions shown in FIG. 12 have different size one another, it should be noted that it does not necessarily mean that the light attenuates to reduce the illuminance for a larger light distribution region.

For example, as for the segment forming the short range light distribution region (N1), which is the largest light distribution region, by elongating the length of the scanning direction of the third light radiation region (Gf), the time in which the third light radiation region (Gf) remains in the segment becomes longer so as to ensure the sufficient illuminance even for the larger light distribution region.

In this regards, it may be assumed that the larger light distribution region is implemented by successively providing a plurality of segments that form the same light distribution (Gt) one another, as the dependence of the direction of the deflection to be imparted on the position at which the ray is incident on the light incident portion (Pmi) of the deflection pattern generation unit (Fm).

As a result, only one address in the lookup table may be assigned to the larger light distribution region, or alternatively a plurality of addresses may be assigned the larger light distribution region and the same data may be written to the plurality of addresses.

Yet alternatively, different data may be written to the plurality of addresses to allow the temporal illuminance variation to appear.

In order to detect the oncoming vehicle using, for example, an imaging element by the main system (Ua), it is effective to employ a method to take an image of front side at the moment of the head lamp of its own vehicle being turned off and to find the head lamp of the oncoming vehicle from the taken image.

In the case of the light projection device according to the present embodiment, it is preferable to stop the current to the light emitting element during, in the case of the galvanometer, a period in which the deflection mirror (Mdm) is returning or during, in the case of the polygon mirror, a period in which the second light radiation region (Gu) overlaps the vertex of the deflection mirror (Mdm). Thus, it is preferable to configure the light projection apparatus such that the modulation control circuit (Ux) is capable of outputting, for example, a projection stopping period signal (Jz) that becomes high level only during those periods and the main system (Ua) is capable of reading the projection stopping period signal to take the above mentioned image.

On the other hand, when the device has no reason to stop the current to the light emitting element due to its own characteristic such as the above mentioned rotational oscillation mirror or the rotational non-parallel glass plate, or otherwise the galvanometer driven with the triangle wave or the sine wave, it is preferable to configure the light projection device such that the signal from the main system (Ua) stops the current to the light emitting element.

Hereinafter, a design of the optical system will be complementarily explained to some extent.

As generally known in the field of the lens design, an optical system composed of one lens can be structurally converted into another optical system made of a combination of a plurality of lenses having the same function, and vice versa. In particular, the former structural conversion is leveraged for the purposes of achieving a function that is physically unattainable with one lens or reducing the aberration by dispersing the power of lens into a plurality of lenses and the like, by setting an input side principal point position and an output side principal point position to a favorable position or introducing the afocal system, while having the same focal point distance towards a target optical system. In the lens disclosed in the drawings of the specification, by leveraging the above mentioned structural conversion or alternatively using an aspherical lens, it is possible to increase or decrease the number of lens so as to improve the performance or the cost of the optical system.

INDUSTRIAL APPLICABILITY

The present invention is applicable to fields or industries for designing and fabricating a light projection device employing a light emitting apparatus such as a semiconductor laser that is capable to be used in a lighting device such as a head lamp for a vehicle.

While certain embodiments have been described, these embodiments have been presented by way of example only, and are not intended to limit the scope of the present invention. The novel apparatuses and methods thereof described herein may be embodied in a variety of other forms. Furthermore, various omissions, substitutions and modifications in the form of the apparatuses and methods thereof described herein may be made without departing from the gist of the present invention. The accompanying claims and their equivalents are intended to cover such forms or modifications as would fall within the scope and gist of the present invention.

REFERENCE SIGNS LIST

A1 Segment
A2 Segment
A9 Segment
Amf Arrow
Amr Arrow
Bd Deflected Light Beam
Bf Light Beam
Bf' Light Beam
Bf" Light Beam
Bmo Exit Light Beam
Bs Light Beam
Bu Light Beam
Ci Bottom Face
Ec1 Light Condensing Optical System
Ec2 Light Condensing Optical System
Ef Second Optical System
Ef' Cylindrical Lens
Eg Optical Fiber
Eg1 Optical Fiber
Eg2 Optical Fiber
Ei1 Incident End
Ei2 Incident End
Eo1 Exit End
Eo2 Exit End
Erg Dichroic Mirror
Er3 Dichroic Mirror
Eu First Optical System
Eu1 Collimator Lens
Eu2 Cylindrical Lens
Ew Light Condenser Lens
Ex1 Collimator Lens
Ex2 Collimator Lens
Ex3 Collimator Lens F1 Long Range Light Distribution Region
F2 Long Range Light Distribution Region
F3 Long Range Light Distribution Region
F4 Long Range Light Distribution Region
F6 Long Range Light Distribution Region
Fm Deflection Pattern Generation Unit
Fw Focused Light Beam
Fx Light Beam
Fx' Light Beam
Gf Third Light Radiation Region
Gf' Third Light Radiation Region
Gf" Third Light Radiation Region
Gf1 Light Radiation Sub Region
Gf2 Light Radiation Sub Region
Gs First Light Radiation Region
Gt Light Distribution
Gu Second Light Radiation Region
Gw Substantially White Colored Light condensing Region
H Optical Sensor
Is Light Emitting Element Current
J1 Driver Circuit Control Signal
J1' Driver Circuit Control Signal
J2 Driver Circuit Control Signal
J2' Driver Circuit Control Signal
Je Light Distribution Instruction Signal
Jm Starting Point Detection Signal
Jz Projection Stopping Period Signal
Ks Radiation Surface Element
Ks' Radiation Surface Element
L1 Left Side Additional Light Distribution Region
L2 Left Side Additional Light Distribution Region
Lms1 Marginal Ray
Lms2 Marginal Ray
Lpf Principal Ray
Lpf' Principal Ray
Lpf" Principal Ray
Lps Principal Ray
Lps' Principal Ray
M1 Intermediate Range Light Distribution Region
M2 Intermediate Range Light Distribution Region
M3 Intermediate Range Light Distribution Region
M6 Intermediate Range Light Distribution Region
Md Dynamic Light Deflection Unit
Mdm Deflection Mirror
Mgal Reverse Rotational Driving Body
Mpol Motor
Mrax Axis of Rotation
Ms Reflective Type Optical Sensor
N Mark
N1 Short Range Light Distribution Region
P1 Driver Circuit
P1' Driver Circuit
P2 Driver Circuit
P2' Driver Circuit
Pgal Galvanometer Driving Circuit
Pmi Light Incident Portion
Pmi1 Light Incident Sub Region
Pmi2 Light Incident Sub Region
Pmo Light Exit Portion
Ps Power Feeding Circuit
Quo Exit Pupil
R1 Right Side Additional Light Distribution Region
R2 Right Side Additional Light Distribution Region
Sc Light Emitting Element
Sc1 Light Emitting Element
Sc1' Light Emitting Element
Sc2 Light Emitting Element
Sc2' Light Emitting Element
Sc3 Light Emitting Element
t0 Phase Originating Point Timing
t1 Phase Starting Point Timing
t2 Timing
t3 Timing
Td Time
U1 Light Source Element
U2 Light Source Element
Ua Main System
Uw Optical System for Synthesizing Substantially White Colored Light
Ux Modulation Control Circuit
x Position
Xef Scanning Effective Interval
Φ Phase Signal

What is claimed is:

1. A light projection device comprising:
a light emitting element;
a power feeding circuit configured to drive the light emitting element;
a first optical system that has a first light radiation region formed by light from the light emitting element, and that forms a second light radiation region by projecting light from the first light radiation region;
a dynamic light deflection unit configured to deflect a light beam involved in forming the second light radiation region in the vicinity of the second light radiation region;
a second optical system disposed downstream from the dynamic light deflection unit, and configured to, upon receiving a deflected light beam obtained by deflecting the light beam by the dynamic light deflection unit, project the deflected light beam to form a third light radiation region; and
a deflection pattern generation unit disposed downstream from the second optical system and configured to deflect and output each ray of the light beam incident to the deflection pattern generation unit so as to convert the incident light beam to an exit light beam,
the deflection pattern generation unit being configured such that, when the deflection pattern generation unit deflects and outputs said each ray of the light beam incident on a light incident portion of the deflection pattern generation unit, a direction of deflection to be imparted is dependent on a position at which said each ray is incident on the light incident portion,
the second optical system being configured to form, at a far side, an image conjugate to the first light radiation region and form the third light radiation region within a partial region of the light incident portion, and the dynamic light deflection unit being configured to continue with an operation of continuously changing the direction in which the light beam is deflected, thereby continuously moving the third light radiation region on the light incident portion.

2. The light projection device according to claim 1, wherein the second light radiation region is conjugate to the first light radiation region.

3. The light projection device according to claim 1, wherein
the third light radiation region formed by the second optical system is conjugate to an exit pupil of the first optical system.

4. The light projection device according to claim 1, wherein
the first light radiation region is formed by a plurality of light emitting elements, and
the third light radiation region is formed by light radiation sub regions divided so as to correspond to the plurality of the light emitting elements, respectively.

5. The light projection device according to claim 1, wherein
the first optical system forms the second light radiation region having an elongated shape that is parallel to a deflection axis of the dynamic light deflection unit.

6. The light projection device according to claim 1, wherein
the deflection pattern generation unit is divided into a plurality of segments, and
dependence of the direction of the deflection to be imparted on the position at which the ray is incident to the light incident portion is defined for each of the plurality of segments such that the exit light beam formed when the third light radiation region is located on each said segment has a specific exit direction distribution.

7. The light projection device according to claim 1 further comprising:
a modulation control circuit configured to modulate an input power to the light emitting element; and
a scanning position detection unit configured to detect a position of the third light radiation region on the deflection pattern generation unit, wherein
the modulation control circuit modulates the input power to the light emitting element depending on the position of the third light radiation region on the deflection pattern generation unit on the basis of information from the scanning position detection unit, thereby raising or lowering luminous intensity of a light beam having a specific exit direction distribution among the exit light beam such that the luminous intensity of the light beam becomes greater or smaller than defined standard luminous intensity.

8. The light projection device according to claim 7, wherein
the modulation control circuit has a lookup table that stores data, which is used when modulating the input power to the light emitting element depending on the position of the third light radiation region on the deflection pattern generation unit, for each address corresponding to the position, and
when the lookup table is read, the data for modulation is read on the basis of an address value generated from a digital numerical value of the position generated by the scanning position detection unit.

9. The light projection device according to claim 1, wherein
in order to achieve that the direction of the deflection to be imparted is dependent on the position at which the ray is incident on the light incident portion, the deflection pattern generation unit has a light reflective surface of which normal direction varies with a position thereof.

10. The light projection device according to claim 1, wherein
in order to achieve that the direction of the deflection to be imparted is dependent on the position at which the ray is incident on the light incident portion, the deflection pattern generation unit has a light refractive medium of which thickness or refractive index varies with a position thereof.

11. The light projection device according to claim 1, wherein
in order to achieve that the direction of the deflection to be imparted is dependent on the position at which the ray is incident on the light incident portion, the deflection pattern generation unit has a diffraction grating having an interference fringe of which phase varies with a position thereof.

12. A head lamp for a vehicle that projects light by using the light projection device according to claim 1.

* * * * *